US010867635B2

(12) United States Patent
Rav-Acha et al.

(10) Patent No.: US 10,867,635 B2
(45) Date of Patent: Dec. 15, 2020

(54) METHOD AND SYSTEM FOR GENERATION OF A VARIANT VIDEO PRODUCTION FROM AN EDITED VIDEO PRODUCTION

(71) Applicant: VIMEO, INC., New York, NY (US)

(72) Inventors: Alexander Rav-Acha, Rehovot (IL); Oren Boiman, Sunnyvale, CA (US)

(73) Assignee: VIMEO, INC., New York, NY (US)

( * ) Notice: Subject to any disclaimer, the term of this patent is extended or adjusted under 35 U.S.C. 154(b) by 0 days.

(21) Appl. No.: 15/919,835

(22) Filed: Mar. 13, 2018

(65) Prior Publication Data

US 2018/0204597 A1  Jul. 19, 2018

Related U.S. Application Data

(63) Continuation-in-part of application No. 15/012,875, filed on Feb. 2, 2016, now Pat. No. 9,928,877, which is a continuation-in-part of application No. 14/538,361, filed on Nov. 11, 2014, now Pat. No. 9,324,374.

(60) Provisional application No. 62/470,410, filed on Mar. 13, 2017, provisional application No. 62/110,651, (Continued)

(51) Int. Cl.
| | |
|---|---|
| *G11B 27/031* | (2006.01) |
| *H04N 21/2343* | (2011.01) |
| *H04N 21/234* | (2011.01) |
| *G11B 27/28* | (2006.01) |
| *H04N 21/854* | (2011.01) |

(52) U.S. Cl.
CPC ............ *G11B 27/031* (2013.01); *G11B 27/28* (2013.01); *H04N 21/23418* (2013.01); *H04N 21/23439* (2013.01); *H04N 21/854* (2013.01)

(58) Field of Classification Search
CPC ................. G11B 27/031; G11B 27/28; H04N 21/23418; H04N 21/23439
See application file for complete search history.

(56) References Cited

U.S. PATENT DOCUMENTS

| | | | |
|---|---|---|---|
| 5,442,744 A * | 8/1995 | Piech .................. | G11B 27/034 715/251 |
| 5,990,980 A | 11/1999 | Golin | |

(Continued)

OTHER PUBLICATIONS

Carsten Rother, Sanjiv Kumar, Vladimir Kolmogorov and Andrew Blake, Digital Tapestry, CVPR 2005.
(Continued)

*Primary Examiner* — Eileen M Adams
(74) *Attorney, Agent, or Firm* — BakerHostetler

(57) ABSTRACT

A method for generating a variant video production from an original video production is provided herein. The method may include the following steps: obtaining an original video production made of a plurality of visual assets being video cuts and/or images and at least one original audio track; automatically analyzing content of the original video production, to separate said visual assets; automatically detecting and storing editing operations applied on the visual assets during creation of the original video production; and automatically generating a variant video production based on at least some of the separated visual assets, wherein only some of the separated visual assets retain respective editing operations applied on the visual assets during the creation of the original video production.

10 Claims, 17 Drawing Sheets

Related U.S. Application Data filed on Feb. 2, 2015, provisional application No. 61/902,307, filed on Nov. 11, 2013.

(56) References Cited

U.S. PATENT DOCUMENTS

| | | | | |
|---|---|---|---|---|
| 6,272,279 | B1* | 8/2001 | Yokoyama | G11B 27/034 386/230 |
| 6,882,793 | B1* | 4/2005 | Fu | H04N 9/87 386/241 |
| 9,106,812 | B1* | 8/2015 | Price | H04N 21/8549 |
| 9,189,137 | B2 | 11/2015 | Boiman et al. | |
| 9,324,374 | B2 | 4/2016 | Rav-Acha et al. | |
| 9,524,752 | B2 | 12/2016 | Rav-Acha et al. | |
| 2011/0218997 | A1 | 9/2011 | Boiman et al. | |
| 2011/0242130 | A1 | 10/2011 | Toba | |
| 2013/0196292 | A1* | 8/2013 | Brennen | G09B 19/06 434/157 |
| 2014/0092424 | A1* | 4/2014 | Grosz | G06F 3/04845 358/1.15 |
| 2014/0133834 | A1* | 5/2014 | Shannon | H04N 9/80 386/278 |
| 2014/0241612 | A1 | 8/2014 | Rehmann et al. | |
| 2015/0380014 | A1* | 12/2015 | Le Magoarou | G10L 25/81 704/258 |

OTHER PUBLICATIONS

Paul Viola and Michael Jones, Robust Real-time Object Detection, IJCV 2001.

Navneet Dalal, Bill Triggs and Cordelia Schmid, Human detection using oriented histograms of flow and appearance, ECCV 2006, pp. 428-441.

Jamie Shotton, John Winn, Carsten Rother and Antonio Criminisi, TextonBoost, Joint Appearance, Shape and Context Modeling for Multi-Class Object Recognition and Segmentation in European Conference on Computer Vision (2006), pp. 1-15.

W. Zhao, R. Chellappa, A. Rosenfeld and P.J. Phillips, Face Recognition: A Literature Survey, ACM Computing Surveys, 2003, pp. 399-458.

M. Irani and S. Peleg, Motion Analysis for Image Enhancement: Resolution, Occlusion, and Transparency. Journal of Visual Communication and Image Representation, vol. 4, No. 4, pp. 324-335, Dec. 1993.

M. Turk, A. Pentland, Eigenfaces for Recognition, Journal of Cognitive Neuroscience, vol. 3, No. 1, 1991, pp. 71-86.

Laurent Itti, Christof Koch and Ernst Niebur, A Model of Saliency-based Visual Attention for Rapid Scene Analysis, IEEE Transactions on Pattern Analysis and Machine Intelligence, vol. 20, pp. 1254-1259, Nov. 1998.

Kaminski Jeremy Yirmeyahu, Shavit Adi, Knaan Dotan and Mina Teicher, Head orientation and gaze detection from a single image, International conference of computer vision theory and applications. 2006.

Mikolajczyk Krystian et al; Multiple Object Class Detection with a Generative Model; CVPR'06—Proceedings of the 2006 IEEE Computer Society Conference on Computer Vision and Pattern Recognition—vol. 1; pp. 26-36; Washington DC, USA, Jun. 17-22, 2006.

Xin Li et al; Latent Semantic Representation Learning for Scene Classification; Department of Computer and Information Sciences, Temple University, Philadelphia, PA 19122, USA; ICML'14 Proceedings of the 31st International Conference on International Conference on Machine Learning—vol. 32; pp. II-532-II-540; Beijing, China, Jun. 21-26, 2014.

Monay Florent et al; PLSA-based image auto-annotation: constraining the latent space;Proceedings of the 12th annual ACM international conference on Multimedia pp. 348-351; New York, NY, USA, Oct. 10-16, 2004.

Yung-Yu, Chuang et al; Animating Pictures with Stochastic Motion Textures; ACM Transactions on Graphics, vol. 24, No. 3, to appear, Proceedings of ACM SIGGRAPH 2005, Jul. 2005, Los Angeles.

Yuan, Lu et al; Image deblurring with blurred/noisy image pairs; SIGGRAPH '07 ACM SIGGRAPH 2007 papers; vol. 26, Issue 3, Jul. 2007.

Litvin, Yevgeni et al; Monaural speech/music source separation using discrete energy separation algorithm; Journal of Signal Processing, vol. 90, pp. 3147-3163, Dec. 2010.

\* cited by examiner

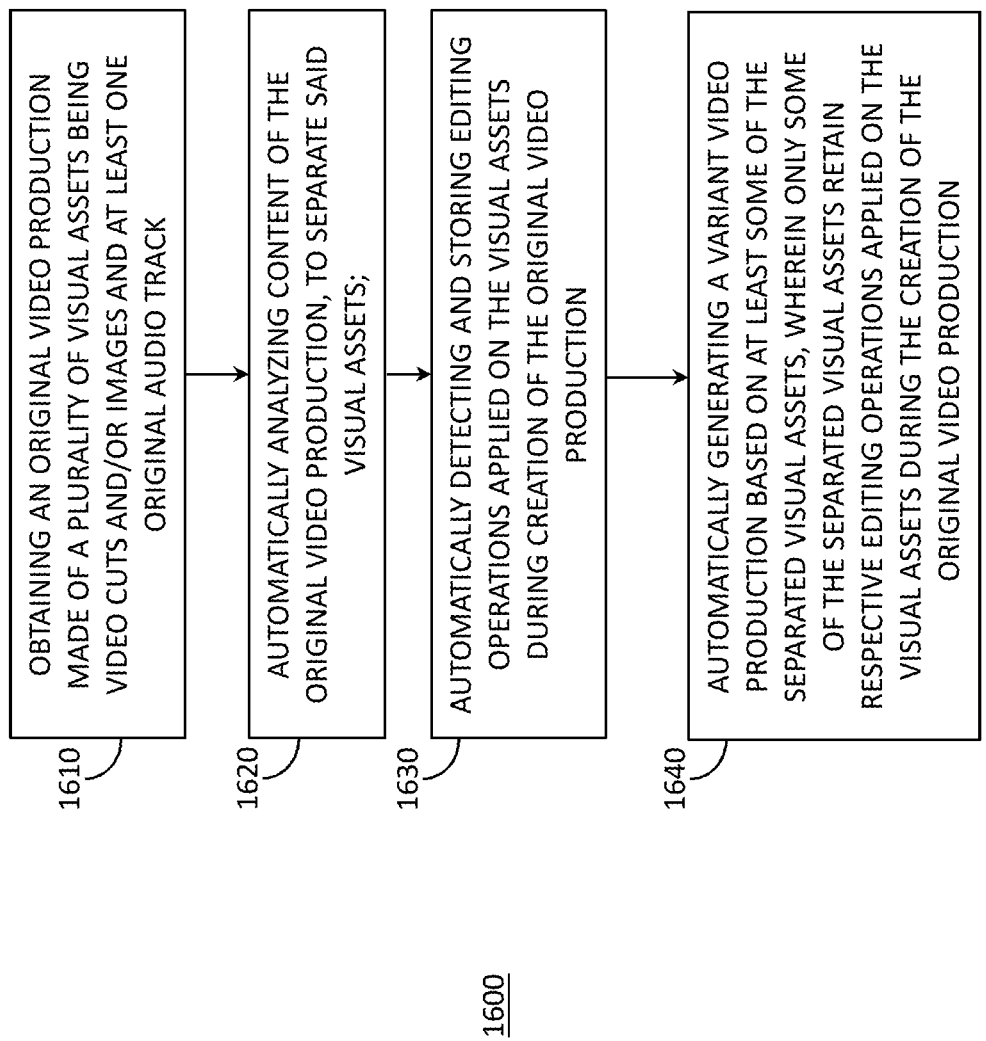

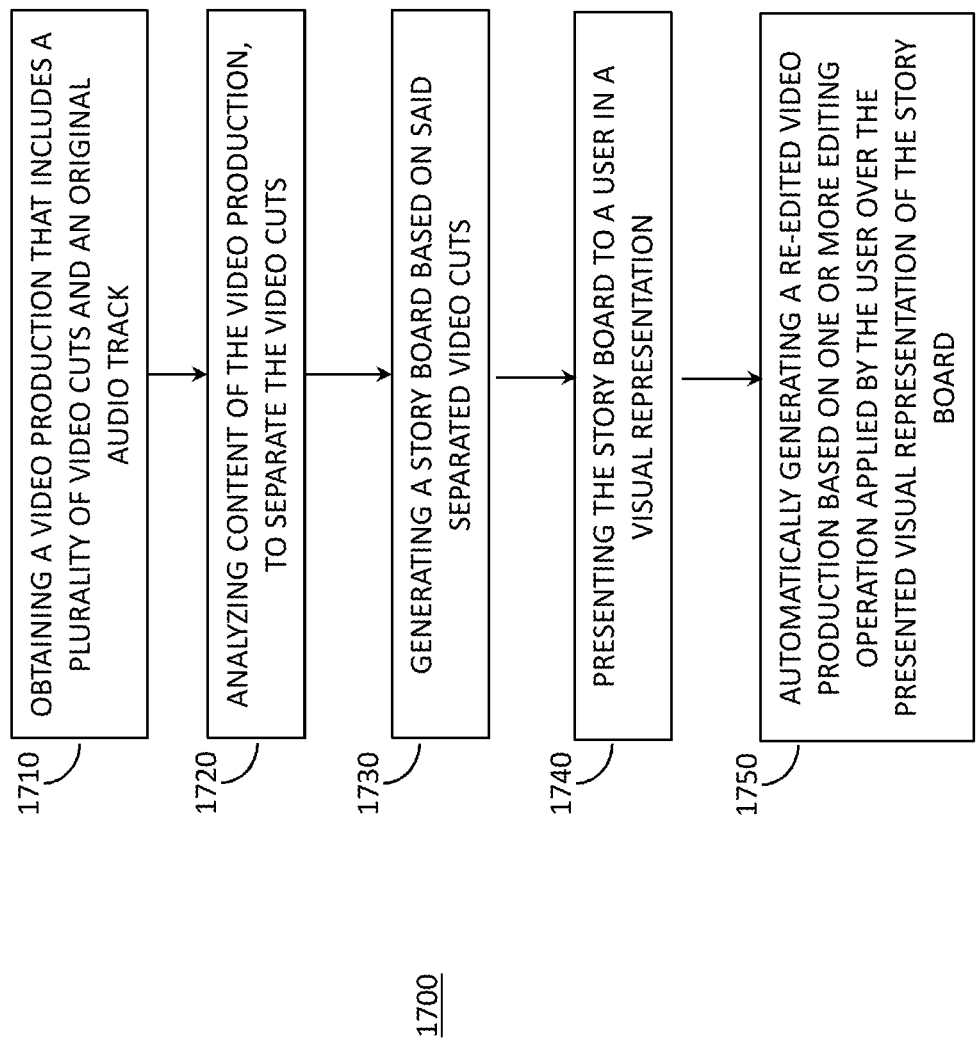

METHOD AND SYSTEM FOR GENERATION OF A VARIANT VIDEO PRODUCTION FROM AN EDITED VIDEO PRODUCTION

CROSS-REFERENCE TO RELATED APPLICATIONS

This Application claims priority from U.S. Provisional Patent Application No. 62/470,410, filed on Mar. 13, 2017 and is also a Continuation-in-Part of U.S. patent application Ser. No. 15/012,875, filed on Feb. 2, 2016, which claimed priority from U.S. Provisional Patent Application No. 62/110,651, filed on Feb. 2, 2015, and was also a Continuation-in-Part of U.S. patent application Ser. No. 14/538,316, filed on Nov. 11, 2014, which claimed priority from U.S. Provisional Patent Application No. 61/902,307, filed on Nov. 11, 2013, all of which are incorporated herein by reference in their entireties.

FIELD OF THE INVENTION

The present invention relates generally to computer vision, and more particularly, to employing computer vision techniques in generating variant video productions from an edited video production.

BACKGROUND OF THE INVENTION

Prior to the background of the invention being set forth, it may be helpful to set forth definitions of certain terms that will be used hereinafter.

The term "object" as used herein is defined as an entity in an image (e.g. a photo), or set of images, that corresponds to a real object in the world, e.g. a person, pet or even an inanimate object as a car. Therefore, a single person that is recognized in multiple images will be considered as a single object, having several instances.

The term "video production" as used herein is defined as a video file that has been created either manually or automatically by composing together a series of edited video cuts or photos, and possibly a soundtrack, transitions between the video cuts and some video effects, to form a self-contained audio-visual work. The processing of selecting parts from an original footage and creating of video production is usually referred to as "video editing".

A common use-case of video editing, especially for businesses, is creating a one-time and expensive movie, and reusing it as much as possible for multiple purposes. Due to their cost, it would be advantageous to generate variants of the tailored video productions in a cost efficient manner.

SUMMARY OF THE INVENTION

Embodiments of the present invention overcome the aforementioned challenge of automatically generating variants of an already edited video production. A system and method for re-editing this already-edited video according to user preferences by automatically separating the edited video into video cuts, each originating from a different video shot, . . . and generating a storyboard from these shots, and then re-composing it in a new way. For example, the user can make the original movie shorter or re-synchronize the movie to a different music soundtrack while trying to respect the original editing. The invention also describes the user interface UI which enables the user to manipulate the storyboard, for example by removing some of the shots or by changing the order of the shots.

Some embodiments of the present invention provide a method for automatically generating a variant video production from an original video production. The method may include the following steps: obtaining an original video production made of a plurality of visual assets being video cuts and/or images and at least one original audio track; automatically analyzing content of the original video production, to separate said visual assets; automatically detecting and storing editing operations applied on the visual assets during creation of the original video production; and automatically generating a variant video production based on at least some of the separated visual assets, wherein only some of the separated visual assets retain respective editing operations applied on the visual assets during the creation of the original video production.

Some other embodiments of the present invention provide a method for assisting re-editing of a video production. The method may include the following steps: obtaining a video production that includes a plurality of video cuts and an original audio track; analyzing content of the video production, to separate said video cuts; generating a story board based on said separated video cuts; presenting the story board to a user in a visual representation; and automatically generating a re-edited video production based on one or more editing operations applied by the user over the presented visual representation of the story board.

These, additional, and/or other aspects and/or advantages of the embodiments of the present invention are set forth in the detailed description which follows; possibly inferable from the detailed description; and/or learnable by practice of the embodiments of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings:

FIG. 16 is a flowchart diagram illustrating another aspect of the method in accordance with embodiments according to the present invention; and FIG. 17 is a flowchart diagram illustrating another aspect of the method in accordance with embodiments according to the present invention.

DETAILED DESCRIPTION OF THE INVENTION

Figure 1:
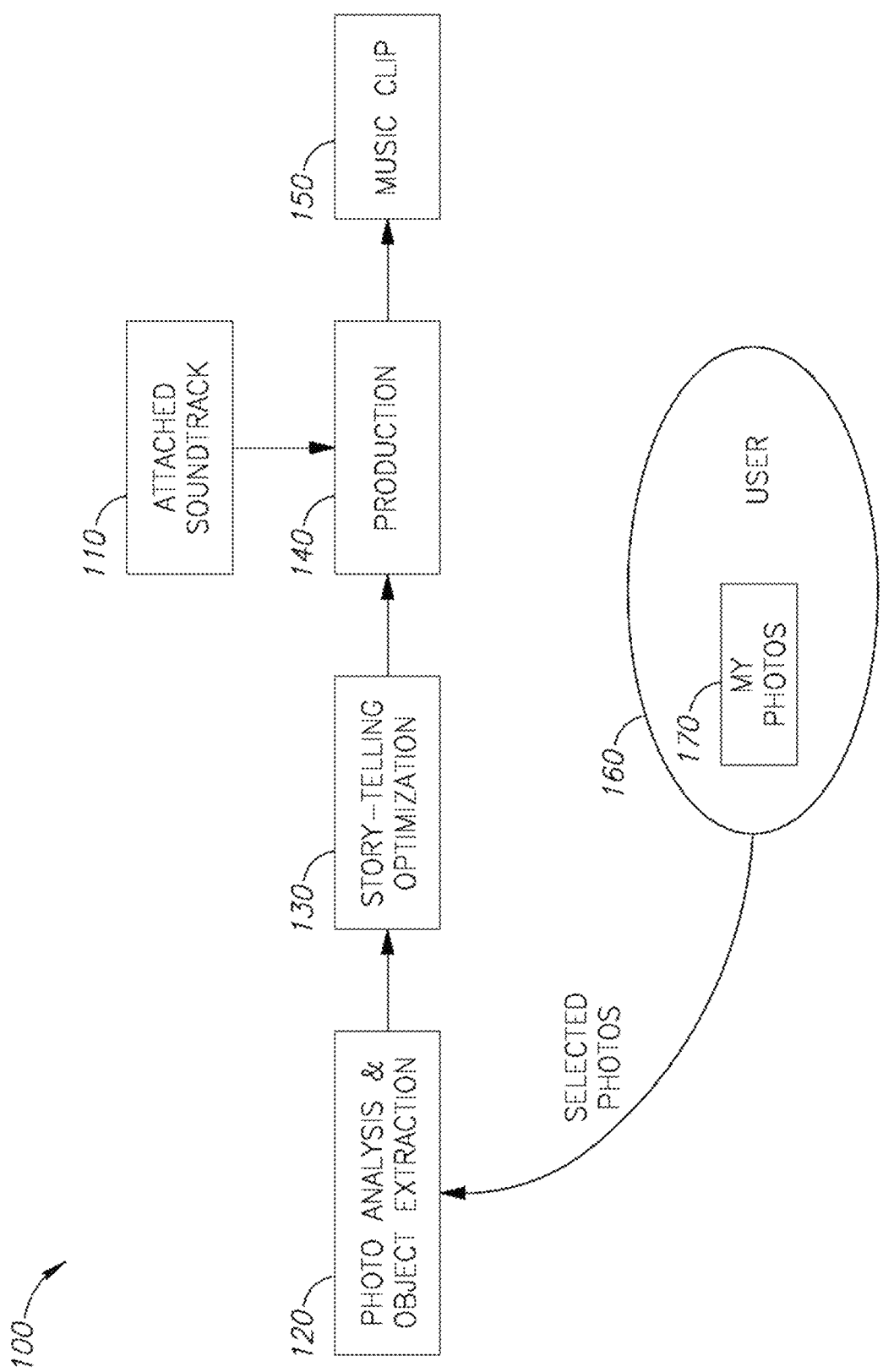
FIG. 1 is a schematic block diagram illustrating a system according to embodiments of the present invention.

With specific reference now to the drawings in detail, it is stressed that the particulars shown are by way of example and for purposes of illustrative discussion of the preferred embodiments of the present technique only, and are presented in the cause of providing what is believed to be the most useful and readily understood description of the principles and conceptual aspects of the present technique. In this regard, no attempt is made to show structural details of the present technique in more detail than is necessary for a fundamental understanding of the present technique, the description taken with the drawings making apparent to those skilled in the art how the several forms of the invention may be embodied in practice.

Before at least one embodiment of the present technique is explained in detail, it is to be understood that the invention is not limited in its application to the details of construction and the arrangement of the components set forth in the following description or illustrated in the drawings. The present technique is applicable to other embodiments of or being practiced or carried out in various ways. Also, it is to be understood that the phraseology and terminology employed herein is for the purpose of description and should not be regarded as limiting.

FIG. 1 is a block diagram illustrating a schematic flow of a system 100 in accordance with some embodiments of the present invention. System 100 may obtain one or more photos, usually 'my photos' 170 being a repository of photos taken by a user 160. The first element of system 100 is the photo-analysis and objects extraction module 120 possibly executed by a computer processor (not shown). In objects extraction module 120, the images are analyzed, and various objects such as people, pets or other types of objects are extracted.

The second element is the "story-telling" optimization module 130 which may also be referred as "inter-object relationships" optimization. In the "story-telling" optimization module 130, portions of the captured photos (hereinafter: images) may be organized in space and time to create a so-called narrative being a sequence of occurrences of one or more contexts. The organization of the objects and image portions may be based on an analysis of the objects extracted in the first block, and is may be carried out by optimizing a so-called "inter-object relationships" score function. An example for a component in the inter-object relationships score function is the level of continuity in the objects: For example, two image portions will get a high score for being shown sequentially if they apply different cropping operations of the same object. Other exemplary components of the inter-object relationships score function will be detailed herein.

The third element (being optional) is the production module 140. Production module 140 is responsible for adding transitions and effects to the music clip 150, synchronizing the transitions and effects with the music (e.g., synchronizing them to the beats of an attached soundtrack 110), stitching portions of images that will appear together in music clip 150, and the like.

Figure 2:
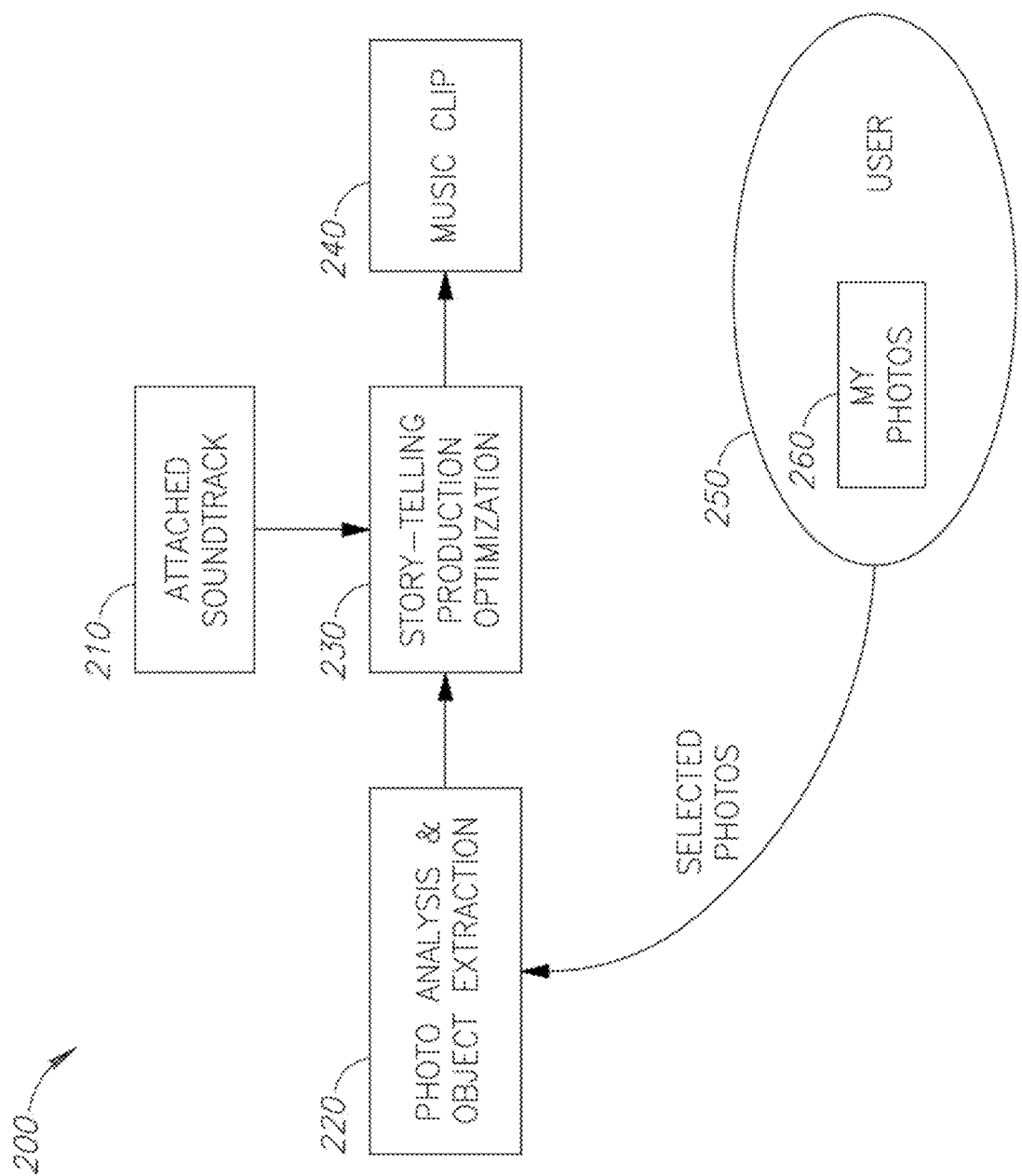
FIG. 2 is a schematic block diagram illustrating a system according to embodiments of the present invention.

FIG. 2 is a schematic block diagram illustrating an alternative implementation of a system 200 according to other embodiments of the present invention. Similarly to system 100, system 200 obtains selected photos from a 'my photos' repository 260 of a user 250. However, as shown here, the "story telling" optimization and the production modules may be unified to a single block 230, in which optimizing the inter-object relationships function and some production parameters (such as the synchronization to music) are carried out simultaneously. An attached soundtrack 210 may be then added to create a music clip 240.

Following below are more details on the photo-analysis object extraction module 220. An 'Object' may be defined herein an entity in an image, or set of images, that corresponds to a real object in the world, for example, a person, a pet or even an inanimate object such as a car. Therefore, a single person that is recognized in multiple images will be considered as a single object, having several object-instances. Formally, if two object-instances $O_1$ and $O_2$ correspond to the same object in the world (e.g.—images of the same person), it would be possible to state that object $(O_1)$=object $(O_2)$. However, for the sake of simplicity, "object-instances" may be referred herein as "objects", when it is clear that an object might have several instances in different images.

Usually the focus would be on extracting interesting objects only, for example, people and pets, and ignore objects that relate to the background such as trees, houses, and the like.

There are various known ways to extract objects from images. Following are described several such methods that can be used for this task:

Detecting a pre-determined class of objects, such as faces, is a well-known problem in computer vision, and there exist a large number of methods that addresses this problem. The detection can be done, for example, using pattern recognition algorithms known in the art for detecting faces, for detecting persons, or for detecting general pre-defined classes of objects. Optionally, an object can be manually indicated by the user, e.g., by tapping on top of the camera's screen, where an instance of this object appears.

An object may correspond to a specific entity and not a general class, e.g., a specific person. To common approach to detect a specific person is using general Face Detection followed by face recognition which identified the specific person.

Objects can also be detected without pre-defining them. For example, detecting objects based on saliency detection algorithms (assuming that the object is salient relative to the background).

In this section, an "inter-object relationships" score will be described in further details, whose optimization is used to determine the organization of the object-instances in the music clip. This is in contrast to a common approach for slide-show generation which simply displays the images in their original order (Either based on their capture times, or on the order of their selection by the user), and without cropping the images around objects according to some story telling criterions.

In video editors' and photographers' communities, it is common to refer to different types of positioning of an object in a picture. There are various common positioning types, such as: Long-shot, Medium shot, Close-Up, Extreme-Close-Up, American, and the like. These types of positioning will be referred herein as "Framing" types, and will determine the framing of the objects in the output music clip as part of the inter-object relationships optimization. Given a positioning of an object in the frame, its "Framing" type is determine by the relationship between the size of the object and the size of the image in which it appears. For example, for the case of a person, the framing is usually determined by the ratio between the size of the face and the height of the region in the image bellow the face. A simple way to change the framing of an object is to use image cropping.

Figure 3:
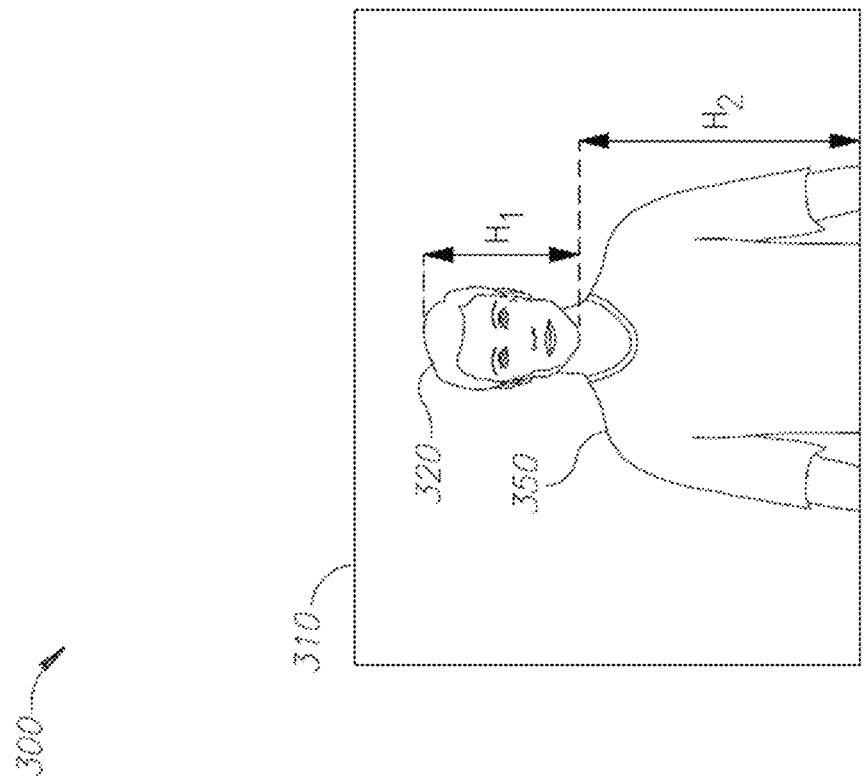
FIG. 3 is a diagram illustrating an aspect of the system in accordance with embodiments according to the present invention.
Figure 3:
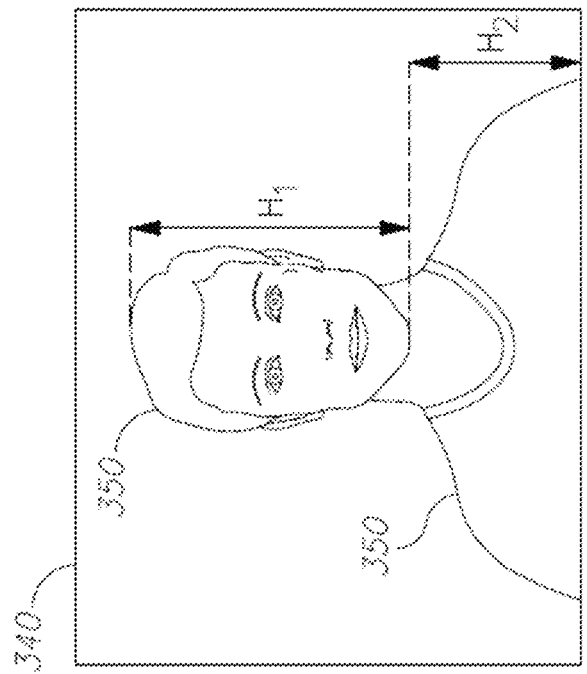

FIG. 3 is a diagram 300 illustrating an aspect of the system in accordance with embodiments according to the present invention. The figure demonstrates two framing types: Medium Shot 310 and Close-Up 340. One way to define a framing type for the case of a person is by comparing the ratio $H_1/H_2$ to pre-defined thresholds where $H_1$ related to the head 320 of the person and $H_2$ relates to the torso 350 of the same person. The framing for general objects can be defined, for example, based on the portion of the image captured by the object (e.g.—if it is big enough, it will be denoted as a "Close-Up", and the like).

As mentioned before, the Story-Telling optimization determines the organization of objects or parts of objects in the output video clip. In this section we define the space of possible object organizations over which we optimize the story-telling score.

Assume that there are K object-instances $\{O_1, \ldots, O_k\}$ detected in the images, and there is a pre-determined set of possible framing types $\{fr_1, \ldots fr_l\}$ such as 'Close-Up', 'Medium-Shot', and the like.

Figure 4:
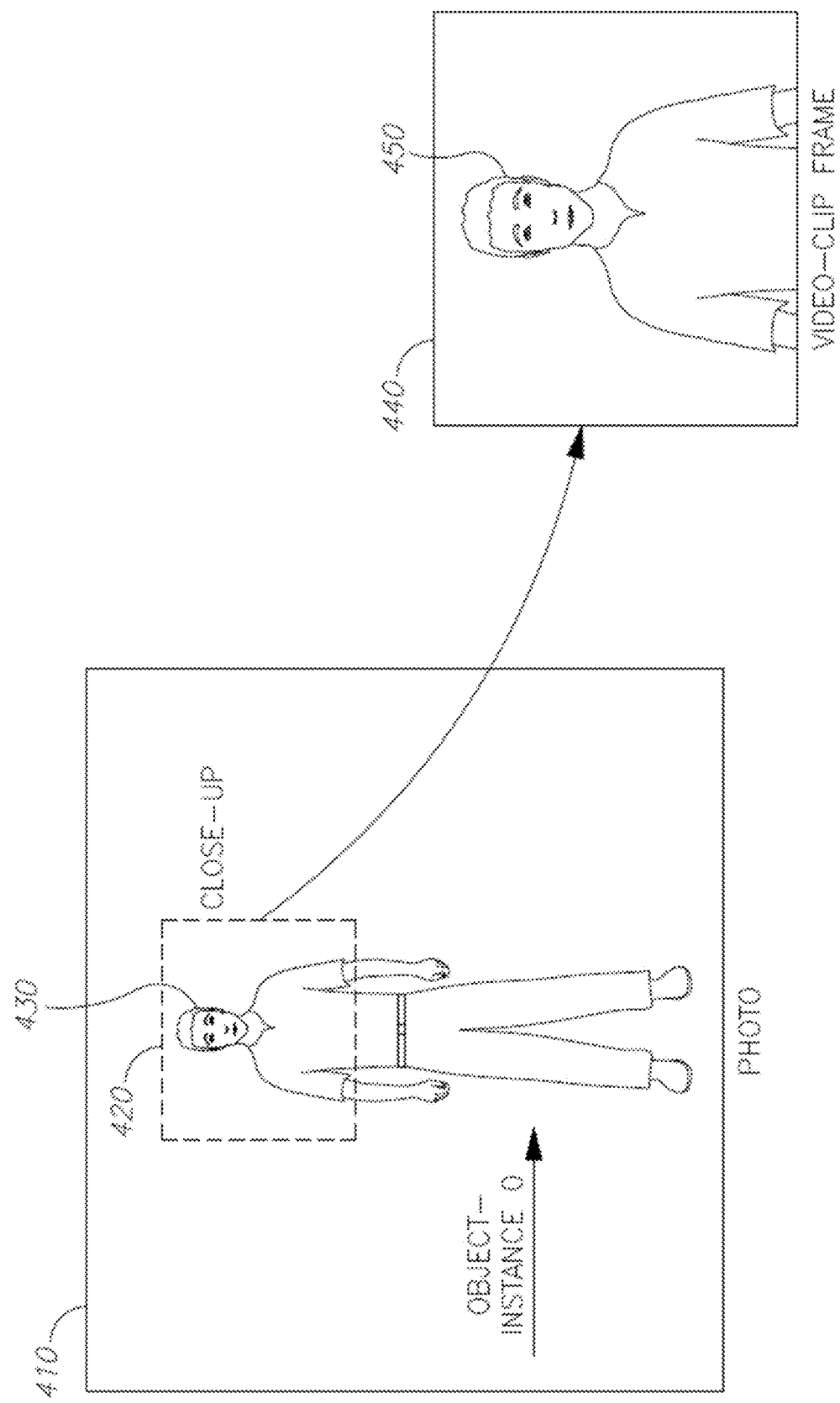
FIG. 4 is a diagram illustrating an aspect of the system in accordance with embodiments according to the present invention.

A reframing pair $P=(O_i, fr_j)$ may be defined as a pair of object-instance and a framing type: This pair refers to the fact that object-instance $O_i$ appears in the resulting video clip in framing $fr_j$ (which can be obtained, for example, by cropping the image accordingly). FIG. 4 demonstrates an actual implication of such a pair. Obviously, not all pairs of object-instances and framing types are possible: for example, an object that appears in the original image in a medium-shot, cannot appear in the video clip in long-shot. It should be noted that an object may be selected multiple times (including zero), possibly having different framings.

A special case for a reframing pair is the background (which can be considered as a special object), which may also be selected. Usually, the background is shown without cropping, and is considered as a Long-Shot framing (as the image is not focused on any specific object). Thus, images without any "foreground" object can also be displayed in the resulting clip. A relationship between the background object and a regular object may be "The object resides inside the scene corresponding to the background object".

FIG. 4 is a diagram 400 illustrating an aspect of the system in accordance with embodiments according to the present invention. FIG. 410 illustrates the implication of the pair (O, 'Close-Up')—The object instance O is displayed in the video clip in a 'Close-Up' framing 440 taken by cropping 420 from image 410. Where only the head 420 of the user is extracted to be presented 450.

The Story Telling score aims to encourage states that "Tell a good story". This definition is very subjective, but there are objective rules and properties that can make a video clip feel as if it better tells a story, for example, by minimizing cuts between un-related objects.

Optimizing the story telling score gives a spatio-temporal arrangement of the objects, and respectively, a spatio-temporal arrangement of image portions that contains these objects or parts of objects.

By way of non-limiting illustration, several such objectives whose combination gives a Story Telling score will be described herein:

Preserving the Chronological Time

In one embodiment, the Story Telling score is penalized whenever the objects appear in the wrong chronological order as in Eq. (1) below:

$$E^{t-cont}(s_i, \ldots, s_n) = \sum_{\{i>j\}} \sum_{\{O_1 \text{ in } S_i, O_2 \text{ in } S_j\}} \begin{cases} f|t(O_1) - t(O_2)| & \text{if } t(O_1) < t(O_2) \\ 0 & \text{else} \end{cases} \quad \text{Eq. (1)}$$

Were t(O) denotes the capture-time of the object instance O, and f is some cost function (e.g.—f can be constant 1). And wherein a state S is an ordered list of sets $(s_1, s_2, \ldots s_n)$, each $s_i$ being a set of reframing pairs. A desired length of the output video (based on user preferences, or based on the original number of images) may be defined, and penalizes states whose length differs from this length as in Eq. (2) below:

$$E^l(s_i, \ldots, s_n) = f(|l-l_0|) \quad \text{Eq. (2)}$$

Continuity

Where $l_0$ is the desired length and f is some cost function (e.g.—square distance). It would be preferable to display multiple instances of the same object sequentially, rather than jumping between different objects: This can be formalized as in Eq. (3) below:

$$E^{object-cont}(s_i, \ldots, s_n) = \sum_{i} \sum_{\{O_1 \text{ in } S_i, O_2 \text{ in } S_{i+1}\}} \begin{cases} 0 & \text{if object}(O_1) = \text{object}(O_2) \\ 0 & \text{else} \end{cases} \quad \text{Eq. (3)}$$

Where object($O_1$)=object($O_2$) means that $O_1$ and $O_2$ correspond to the same object in the real world.

Object Representation

It would be advisable to panelize objects that appear in the images but are not well represented in the output video clip. Eq. (4) below addresses this problem:

$$E^{rep}(s_i, \ldots, s_n) = \Sigma_{Obj \in \{detected \ object\}} W(\text{Obj}) \text{ if Obj not in } S_i \quad \text{Eq. (4)}$$

It is usually advisable to make a continuous selection of framing around consecutive objects in time. For example—moving from Close-Up to Close-Up, or from Medium-Shot to Medium-Shot (General transition cost can be defined between each pair of framing options). This cost may be denoted as $E^{framing-cont}$, where W(Obj) is the importance of the object. The importance of an object can be determined manually by the user, or automatically estimated based on various parameters (e.g.—people are more important than pets, objects with many instances are more important than object having only a few instances). In an optional implementation, the representativeness can depend also on the framing in which the object appears (e.g.—a Close-Up framing receives a better representation score than a Long-Shot).

It some embodiment, each object instance is forced to appear at least once in the output video. Sometimes it is desirable to place two objects in the same frame, if they refer to each other (i.e.—they are strongly related). For example—two people that are looking on each other, speaking to each other, doing a similar activity, are nearby in space or time, and the like. Eq. (5) below illustrates it:

$$E^{relevance}(s_i, \ldots, s_n) = \sum_i \sum_{\{O_1, O_2 \text{ in } s_i\}} \begin{cases} 0 & \text{if refer}(O_1, O_2) = 1 \\ 1 & \text{else} \end{cases} \quad \text{Eq. (5)}$$

where refer($O_1, O_2$) is an indicator whether $O_1$ and $O_2$ refers to each other (i.e.—are strongly related). Detecting that two objects refer to each other can be done, for example, based on gaze-estimation algorithms and checking if they are looking in the direction of each other, or by measuring the distance in which they appear in space-time.

Alternatively, common cinema editing approach prefer to tell the story by displaying the two objects in consecutive frames, preferably also passing throw a close-up framing. One such example can be based on Eq. (6)

$$E^{relevance}(s_i, \ldots, s_n) = \\ \sum_i \sum_{\{O_1 \text{ in } S_i, O_2 \text{ in } S_{i+1}\}} \begin{cases} 0 & \text{if refer}(O_1, O_2) = 1 \\ 1 & \text{else} \end{cases} \quad \text{Eq. (6)}$$

The story telling score is a unification of all scores. A simple unification option is by summing them all in Eq. (7) below:

$$E^{story} = a \cdot E^{t-cont} + b \cdot E^I + c \cdot E^{object-cont} + d \cdot E^{rep} + e \cdot E^{framing-cont} + f \cdot E^{relevance} \quad \text{Eq. (7)}$$

where a, . . . , f are constant weightings.

Other scores can be used, such as different types of continuity, scores that are relevant only to different parts of the edited video for example first set, and the like.

Optionally, appearance-based scores can also be used, for examples ones that encourage coherence in the appearance between objects that appear in the same frame. Such a score is described in the art for the problem of creating image tapestries (also denoted as "Image Collages"). In addition, packing considerations can also be used: e.g.—adding a score that avoids joining in the same set object-instances that cannot be packed together to the frame-size of the output video.

Optionally, the space-time arrangement may also determine the timing of each set in the output video clip (i.e.—the times in which each object-instance appears and disappears, or even the list of visual effects applied on this object-instance. In this case, the reframing pairs P=($O_i$, $fr_j$) are replaces with 4 tuples: P=($O_i$, $fr_j$, $t_{start}$, $t_{end}$), or 5-tuples: P=($O_i$, $fr_1$, $t_{start}$, $t_{end}$, e), where e is a list of visual effects (from a pre-determined pool of effects, such as different color filters, zoom-in, etc'). This case corresponds to the flow that was described in FIG. 2, i.e.—a combined optimization of Story-Telling and production 230.

The combined optimization of Story-Telling and production, requires as input also the attached soundtrack analysis (relating to the music that will be added to the output video clip), in order to synchronize the transition times (determined by ($t_{start}$, $t_{end}$)) to points of interest in the music, e.g.—beats and down beats.

In this block, the automatic video production of the selected objects is done. In the trivial implementation, object instances that were selected to appear at the same time (i.e.—belongs to the same set $s_i$ can be displayed together using a split screen, and each set is shown for a pre-determined amount of time.

However, the method can also provide a much more compelling automatically produced video clip. The automatic production makes use of a library of effects, transitions, graphic assets and sound tracks, which are determined according to the images and the Story-Telling organization. For instance, an algorithm can choose to use a face-morphing transition effect between two images, or add camera movements to each image. In addition, object instances that are shown together can be stitched in more compelling ways than simple split, e.g.—using an image collage technique known in the art.

The selection of transitions and effects may take into account the inter-object relationships. For example—applying certain transitions such as face-morphing only between instances of the same object or between multiple objects that refer to each other.

In addition, the production stage might correspond to synchronizing the transitions to the attached soundtrack (In the case that this synchronization was not done in the Story-Telling block)

Figure 5:
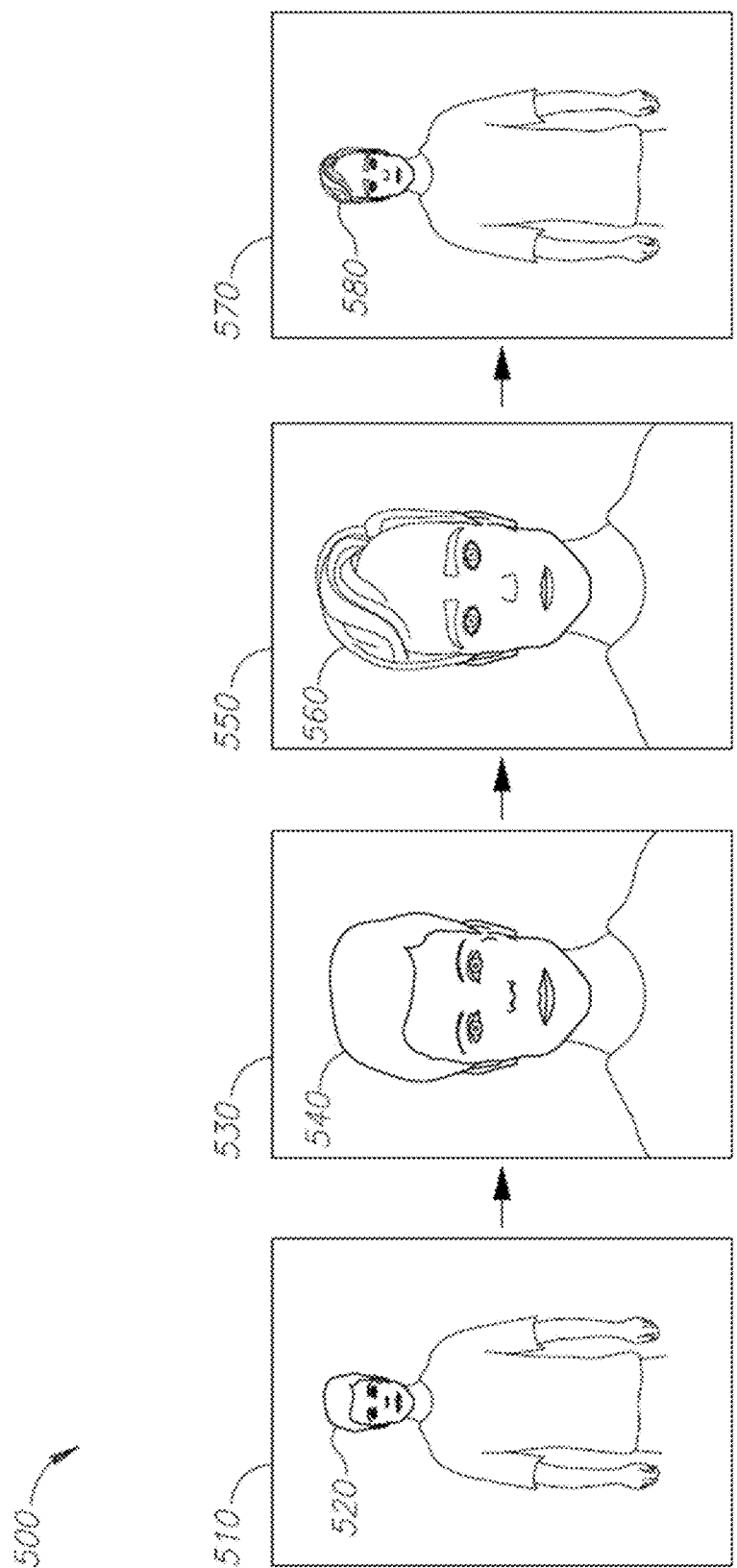
FIG. 5 is a diagram illustrating another aspect of the system in accordance with embodiments according to the present invention.

FIG. 5 is a diagram illustrating another aspect of the system in accordance with embodiments according to the present invention. Two objects (persons) were extracted and a relationship of communication has been detected between the, and so the inter-object function may provide scores accordingly. Thus, a sequence of cropping the original photo showing the two persons into a single photo 510 showing a long shot of person 520 may proceed to a close-up 530 showing a head shot 540 of the user. Then a close-up of the second person 560 is shown 550. This will represent in the clip the relationship of communication between the two persons as the head after head sequence infer a conversation taking place. Finally, a long shot photo 570 is being created of person 580 indicating that the communication session between the two persons is over.

Figure 6:
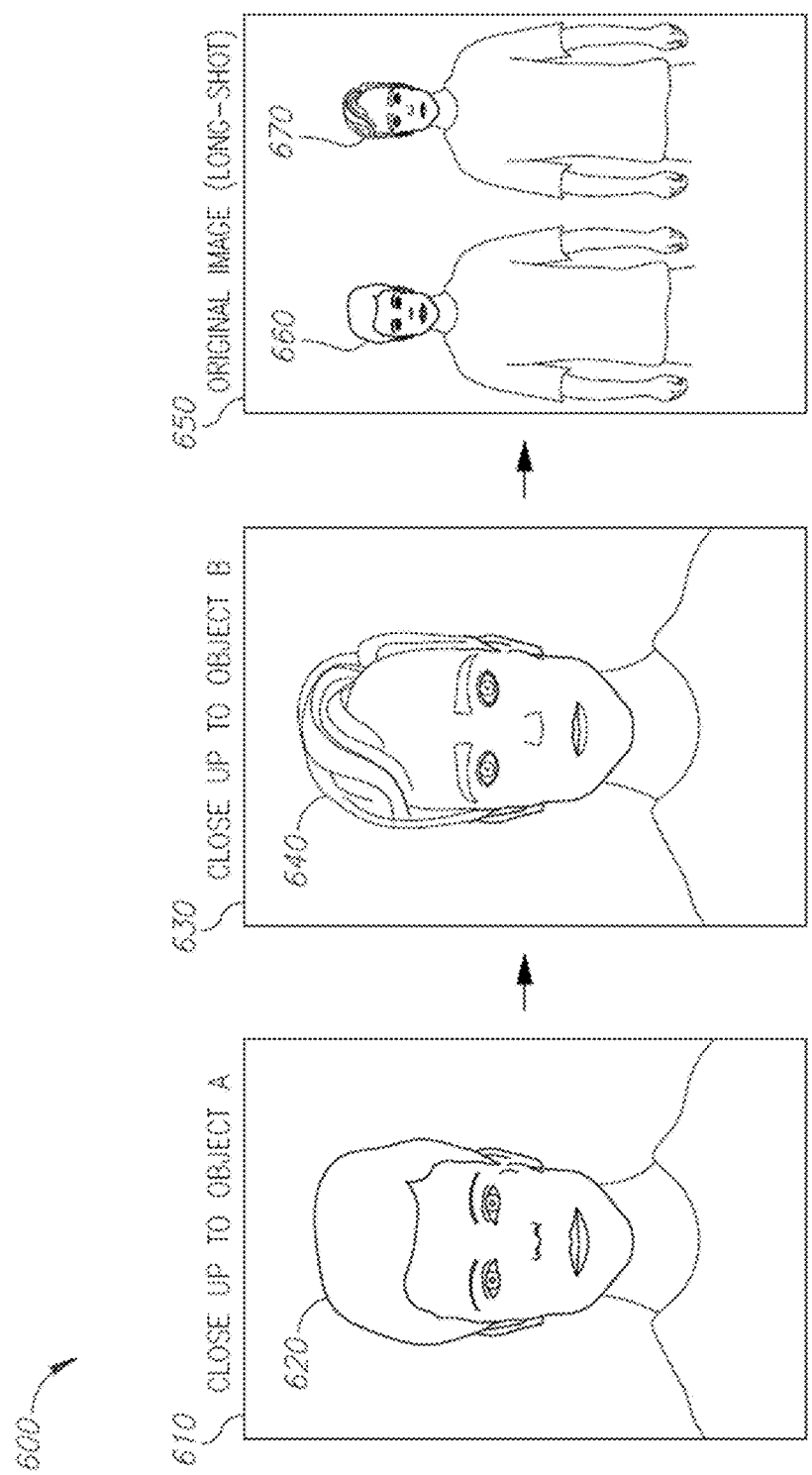
FIG. 6 is a diagram illustrating yet another aspect of the system in accordance with embodiments according to the present invention.

FIG. 6 is a diagram illustrating yet another aspect of the system in accordance with embodiments according to the present invention. An original photo 650 infers that the two persons 660 and 670 are related to each other (walking together, talking with each other and the like). Once this is detected, an artistic cinemascope editing sequence is carried out so that a close-up 610 on object A 620 is shown, then a close-up 620 of object B 670 is shown and only then the original photo 650 showing both person A 660 and person B 670 alike. In this sequence, some level of surprise to the viewer is achieved. The surprise occurs once it is revealed that both persons 660 and 670 are located physically next to each other. This surprise, according to cinemascope editing principles has an effect of an aesthetic value. The story telling function in one embodiment is affected by the concept of information theory according to which a repetitive sequence exhibits little information, while a diverse, surprising sequence exhibits a high amount of information delivered. A story telling function providing high scores is therefore indicative of a tempo-spatial arrangement of objects that exhibit a high amount of information.

Figure 7:
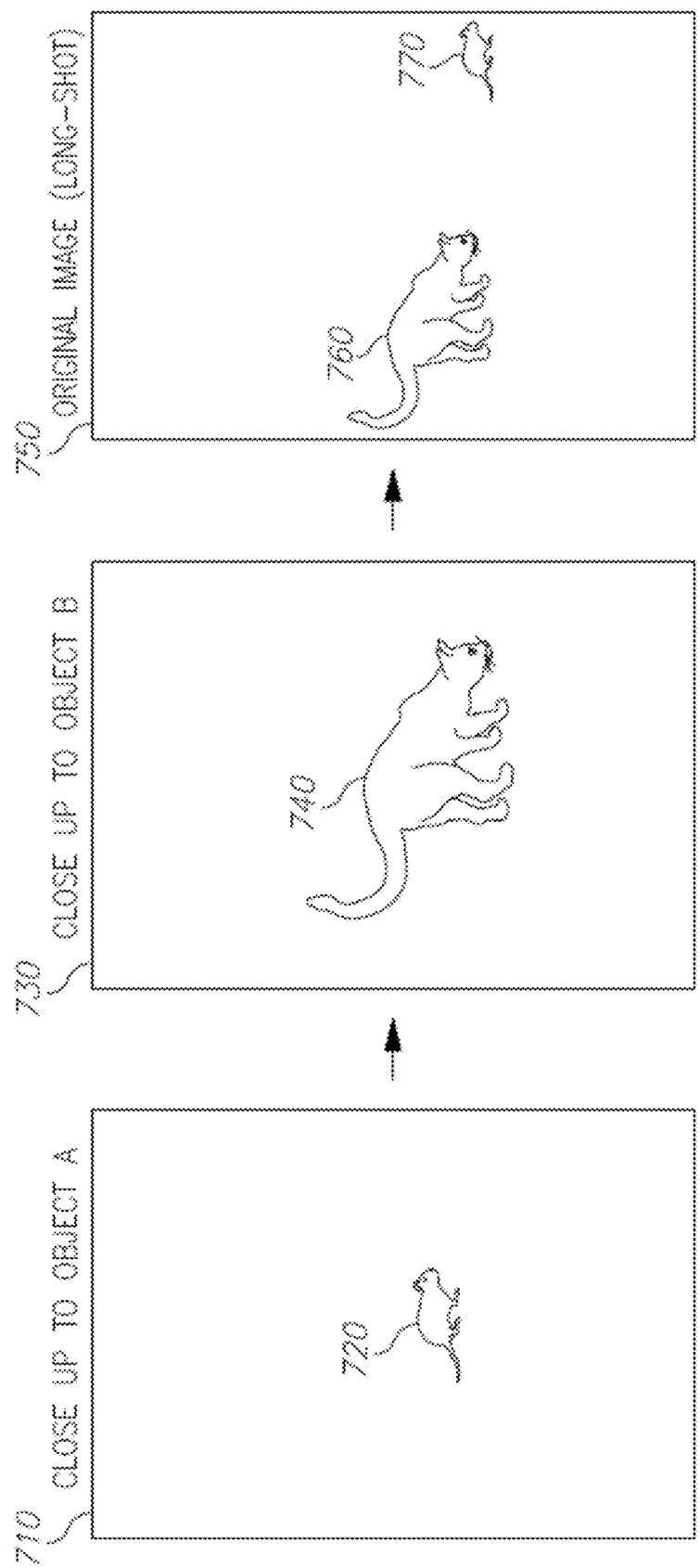
FIG. 7 is a diagram illustrating yet another aspect of the system in accordance with embodiments according to the present invention.

FIG. 7 is a diagram illustrating yet another aspect of the system in accordance with embodiments according to the present invention. An original photo 750 infers that a cat 760 chases a mouse 770 are related to each other in this manner. Once this is detected, an artistic cinemascope editing sequence is carried out so that a close-up 710 on mouse 720 is shown, then a close-up 730 of cat 740 is shown and only then the original photo 750 showing both cat 760 and mouse 770 engaged in the chase.

Figure 8:
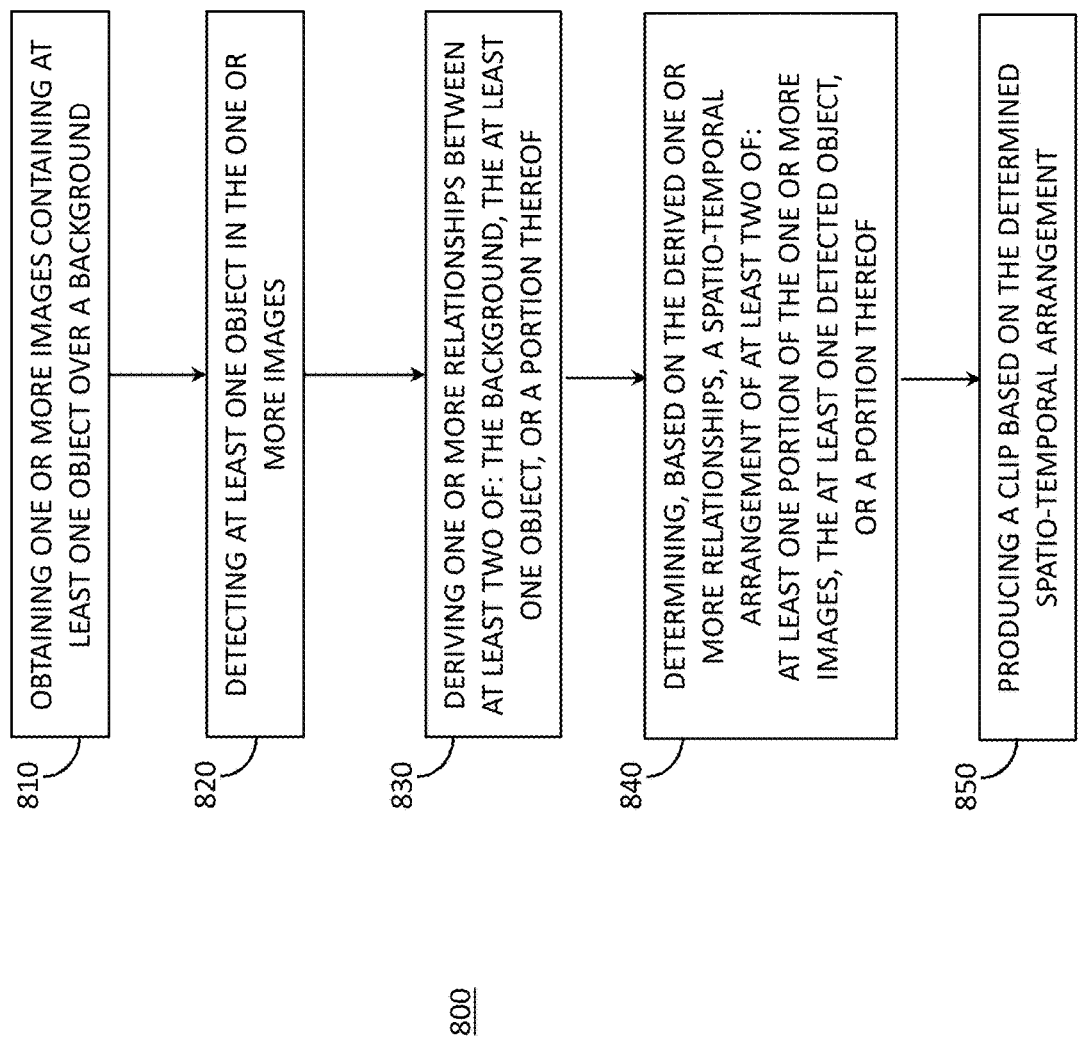
FIG. 8 is a flowchart diagram illustrating an aspect of the method in accordance with embodiments according to the present invention.

FIG. 8 is a flowchart diagram illustrating a generalized method implementing embodiments of the present invention. Method 800 may include: obtaining one or more images containing at least one object over a background 810; detecting at least one object in the one or more images 820; deriving one or more relationships between at least two of: the background, the at least one object or a portion thereof 830; determining, based on the derived one or more relationships, a spatio-temporal arrangement of at least two of: at least one portion of said image, the at least one detected object or a portion thereof 840; and producing a clip based on the determined spatio-temporal arrangement 850.

Figure 9:
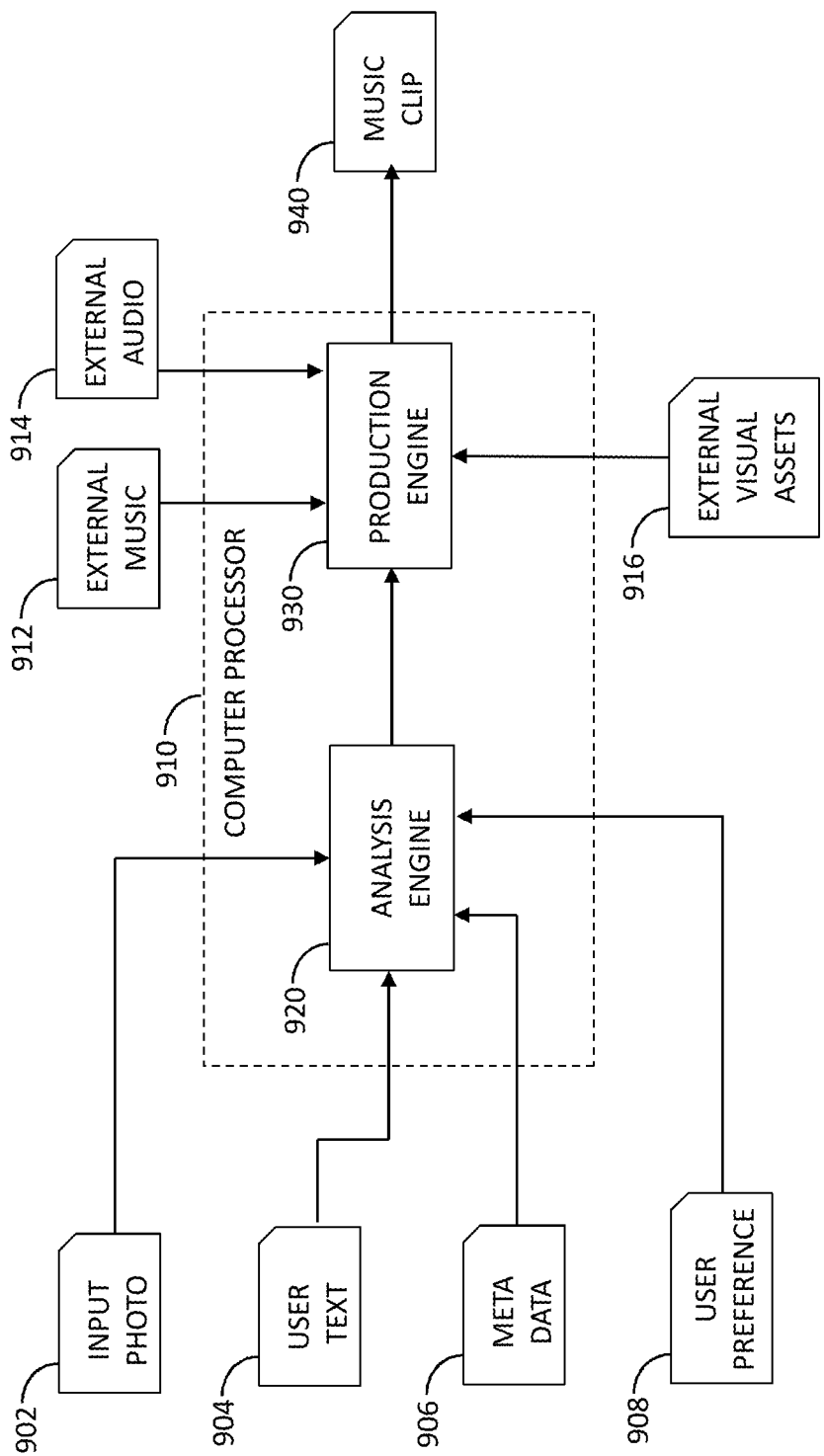
FIG. 9 is a schematic block diagram illustrating a system according to embodiments of the present invention.

FIG. 9 is a block diagram illustrating a block diagram illustrating a schematic flow in accordance with some embodiments of the present invention. The one or more input photos 902, optionally together with additional user text message 904, meta-data 906 and user preferences 908 are inserted into an analysis engine block 920 (possibly executed on computer processor 910), which extracts semantic information such as the scene, important objects in the one or more photos, and the like. Based on the analysis, a music clip 940 is generated from the one or more photos by a production engine (possibly executed on computer processor 910). Additional audio visual assets such as external audio 914, external music 912 or external visual assets 916 may also be added to enrich this clip.

In accordance with embodiments of the present invention, input photo 902 and the user text-message 904, optionally together with some additional meta-data 906 (e.g., GPS information, time of capture, user gender, and the like) and user preferences 908 (e.g., desired emotional impact) are inserted into an analysis engine block 920.

The analysis block 920 extracts semantic information about the desired messaging or intention of the user: such as—the scene in which the photo was taken (e.g., coast, gym, street, school, and the like), objects that appear in the photo (e.g., people, pets, cars, and the like) and general attributes and layout of the image (colors, texture, segmentation map, and the like).

The text message 904 may also be analyzed and joined with the visual analysis of the photo to obtain a more accurate semantic description of the user's message. For example, if a woman is detected in the photo doing a kissing-like action, and the user text was "Love you sweetheart", this may indicate that it is a love message from this woman to her partner. If the user added a preference 908 of "Love" to the system, it makes this assumption even more confident.

The meta-data 906 extracted from the analysis is used in the production stage by production engine 930 to produce the moving message. For example, in the case described in the previous paragraph, the production may add an effect of flying-hearts to the movie or zoom-in to the face of the woman. The production engine also responsible to determining a spatio-temporal arrangement of image portions, based different cropping operations of the image around detected objects or portions thereof.

Additional audio 914 and visual assets 916 may also be added automatically to the produced clip 940 to enrich the moving message, such as sounds or visual assets (e.g.—a map in the case of photo taken in a trip).

Finally, external music 912 may also be added to the produced clip 940, to further boost the emotional impact of the moving message. In this case, the spatio-temporal arrangement of the image portions may be synchronized to the added music.

Analysis Engine

In the analysis engine 920, the input photo 902 is analyzed, optionally using also the attached text message and additional meta-data, such as location information (e.g.—via GPS), time information, camera meta-data, and the like.

The visual analysis may include the following operations:

Detecting objects inside the image, such as: people, pets, inanimate objects, and the like. There is a huge number of publications and research on detection of multiple objects in a single image.

In addition, general information regarding the image can also be extracted such as: the scene in which it was captured (e.g., sea, forest, gym, play-ground, and the like); the event in which it was taken (e.g., party, game), the time in day in which it was taken (day, night), and the like. This can be done using various methods known in the art.

If a user's text message is attached, this text may also be analyzed and used together with the image for improving semantic understanding of the message: e.g., consider the text line "Congratulations for your $8^{th}$ birthday", together with an image of a birthday party with Balloons and a cake. The existence of the word "Birthday" together with the content of the image infers that this is indeed a photo taken during a Birthday party. This information can be used, for example, to assign higher weights to detected objects such as "Balloons" and "Cake", as these objects have high relevancy for a Birthday party. In general, the relation between words and visual tags can be learnt using various methods known in the art.

A simple way to learn these connections is via a co-occurrence matrix of words and use this co-occurrence matrix to match between words in the text and objects detected in the image)

Analysis of the photo layout may also be very useful, for example—determining the image "Safe-Zones": locations in which external assets such as an attached text can be overlaid on top of the photo without obscuring important objects. This idea may be demonstrated where two regions in the image (denoted as $Text_1$ and $Text_2$) are marked as "Safe-Zones"—one is a relatively uniform region (That can be detected, for example, by finding the maximal rectangle for which the sum of gradients is lower than a threshold), and the second is a region that does not include any important object (from a pre-defined set of important objects such as people, pets, and the like). The important objects may be determined automatically from the inferred topic of the message—for example—the topic in Additional information that can be automatically extracted from the image may also be useful, such as its color & texture distribution, an image segmentation, and the like.

Text analysis may also be used for extracting the topic of the message, or for assigning importance measures to the objects and tags extracted from the image. There is a huge amount of literature on text analysis, automatic topic extraction from text, and the like.

External sources of information and attached meta-data data can also be integrated, e.g. choosing music according to location and meta-data (i.e., we know that user is traveling based on his location), adding production effects of hearts to couples on valentine's day, knowing when it's a person's birthday, and the like.

Production Block

Production block 930 may include the following components:

Animating the image: The purpose of this component is to stimulate the image, so it will not appear static and dull. This is done by either invoking artificial motion into the image or using dynamic visual effects.

Decomposition & Story-Telling: This component is responsible for breaking and composing the image again based on the story to be told by the moving message. The new composition is equivalent to a new spatio-temporal arrangement of photo portions: some may correspond to the background, and other correspond to cropping around objects or part of objects.

Text animation: In this component, the user's text message is integrated into the moving message.

Music and Audio: Music is a very effecting tool in stimulating an emotional reaction in people. Thus, a soundtrack is usually added to the movie clip.

Animating the Image

One of the key factors in creating a good moving message is stimulating the image with a dynamic animation so that it will not appear static and dull. This can be done either by simulating an artificial motion from the static image, or by using dynamic visual effects (such effects are common in many video post-production tools such as After-Effects or Nuke). This location and parameters of the effect may be determined by the image content, e.g., adding a sunset effect added to a photo showing a sunset (this can also depend on the user preferences, e.g., if the user chose a romantic message) or adding decorations to the non-salient portions of the image. Another simple case of image animation is adding a motion-trajectory to the image.

Figure 10:
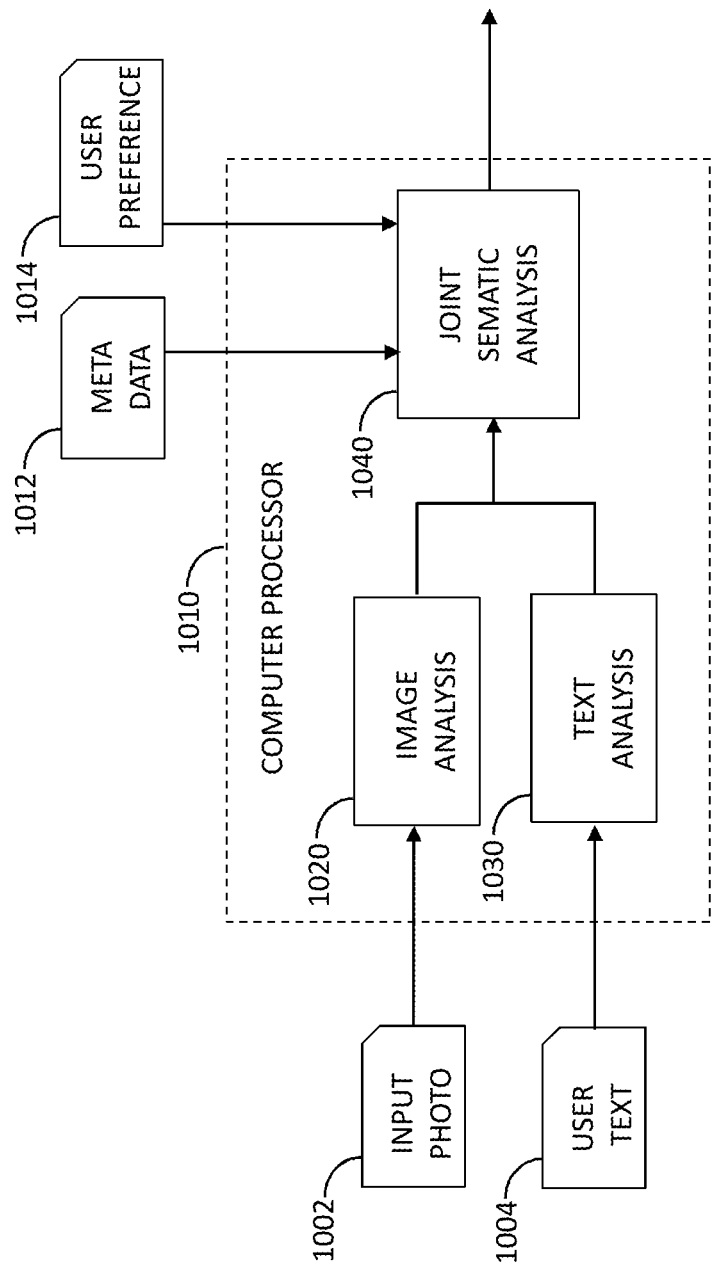
FIG. 10 is a schematic block diagram illustrating a system according to embodiments of the present invention.

FIG. 10 is a block diagram illustrating a block diagram illustrating a slightly different architecture in accordance with some embodiments of the present invention. The input photo 1002 is inserted to image analysis 1020 (carried out by computer processor 1010), user text message 1004 is inserted into a texts engine block 1030 (possibly executed on computer processor 1010), Then the outputs of both image analysis and text analysis are inserted to a joint semantic analysis block 1040 which is fed with meta data 1012 and user preference 1014. The output of the joint semantic analysis is then fed into a production engine (not shown) in a similar manner as discussed, above.

Automatic Generation of a Variant Video Production from an Edited Video Production The remainder of the description below deals with yet other embodiments of the present invention relating to automatic generation of a variant video production from an edited video production and a dedicated user interface supporting a semi-automated generation of such a variant video production. The following embodiments deal with decomposing an already edited video production having its own story telling. It then goes on to generate automatically or semi automatically a variant of the video production while preserving the so called original storytelling.

Figure 11:
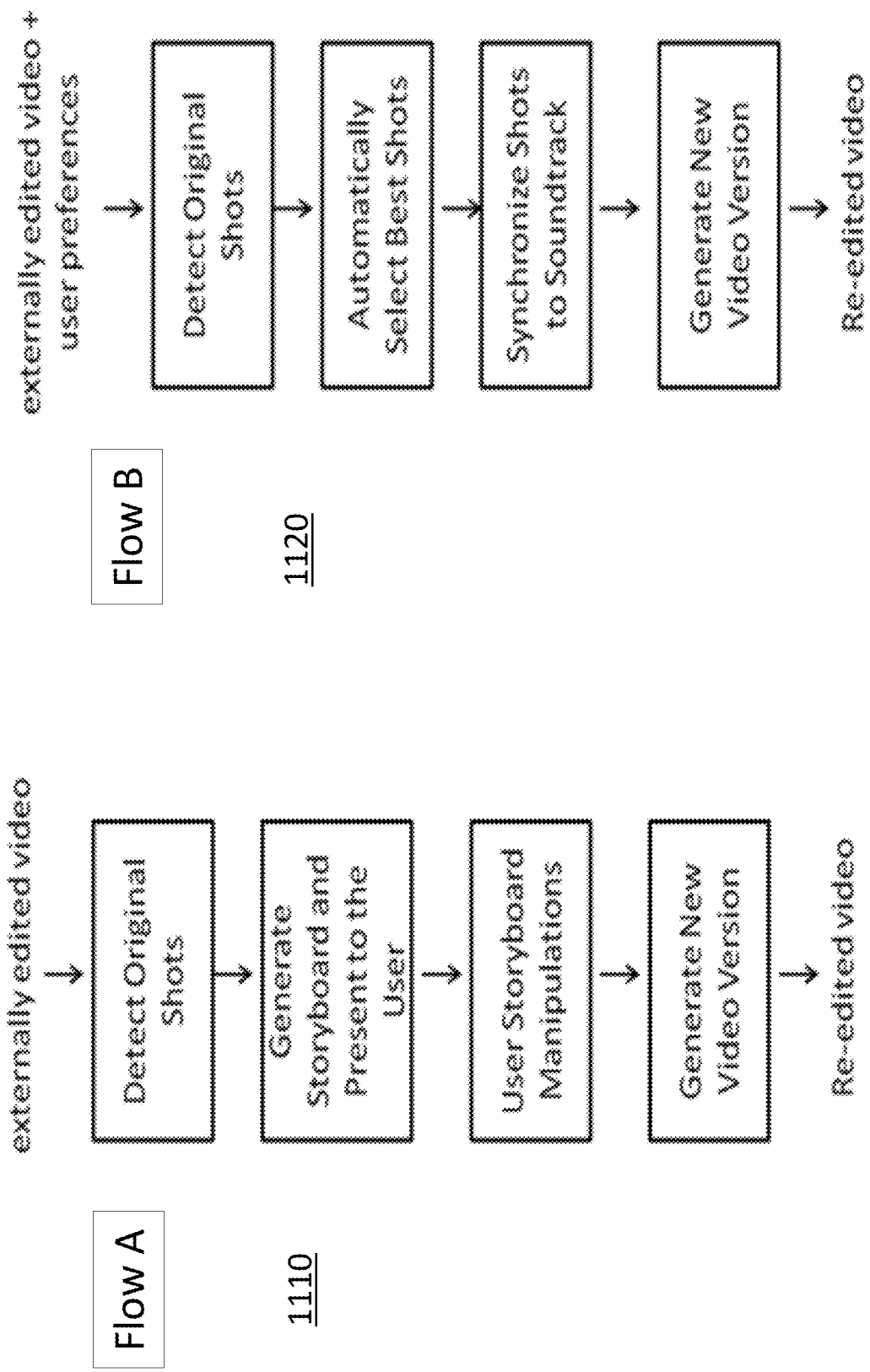
FIG. 11 is a flowchart diagram illustrating another aspect of the method in accordance with embodiments according to the present invention.

FIG. 11 is a flowchart illustrating two flows 1110 and 1120 in accordance with some embodiments relating to the generation of variant video productions. In both flows, the user uploads an already edited video, also denoted herein as video production (for example, a video that was edited manually). Said video is being analyzed, to automatically detect the time borders of each of the original shots.

In flow A, the system automatically generates a storyboard, and presents it to the user, and the user can manipulate this storyboard, for example, remove some of the shots, change the order of shots or even add a new shot. In flow B, general user preferences are received from the user, such as the desired duration of the video or a new soundtrack. In flow B, the editing decisions such as which shots to shorten or to remove is done automatically. Obviously, general user preferences can also be given in flow A. Different examples for user preferences may be: changing editing style (or "theme"), changing pace, determining the aspect ratio of the resulting movie, muting/un-muting the audio, changing amount of visual effects, controlling the weights for automatically selecting the best shots: importance of faces, importance of specific characters, importance of speech, importance of actions, and the like.

Based on the user preferences and/or user storyboard manipulations, a new version of the original video is generated in both flows. Optionally, the reassembling of the shots into a new edited video consists of refining the duration of the shots in order to maximally synchronize the transitions between the refined shots and music beats (or other musical elements) in the soundtrack. The generation of the new edited video may involve additional operations that are typical for video editing: adding visual effects and transitions between shots, cropping the video to a different aspect ratio if needed, stabilizing the video if needed, and the like. Each one of the flows, or a combination thereof may be repeated iteratively until the user is satisfied. In such a case, the output of the flow in each iteration is not only a re-edited video but also the respective storyboard (and optionally other editing decisions) that were done in this step.

All the components of the system are described in more detail in the following sections.

Figure 12:
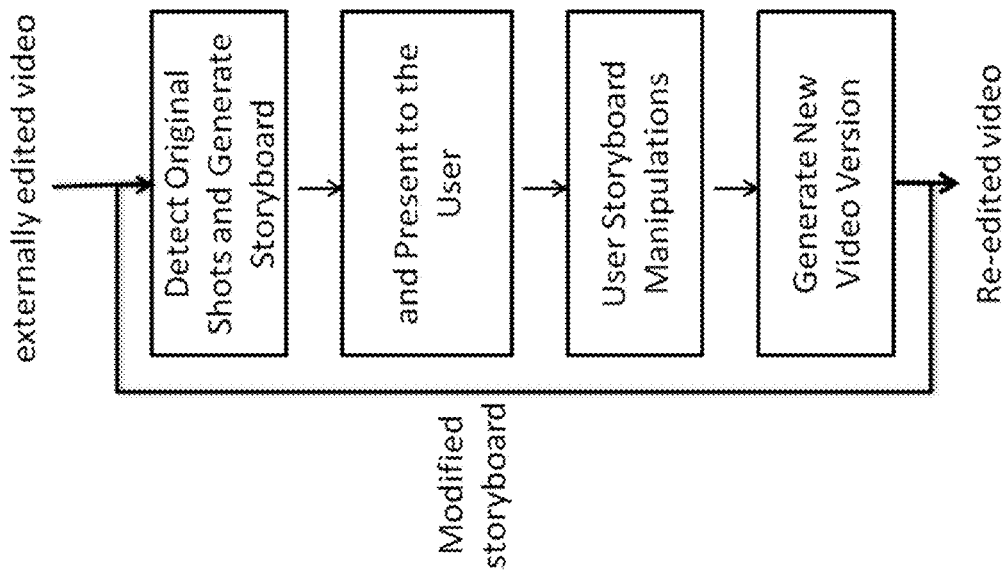
FIG. 12 is a flowchart diagram illustrating another aspect of the method in accordance with embodiments according to the present invention.

FIG. 12 is a flowchart diagram illustrating another aspect of the method in accordance with some embodiments according to the present invention; Flowchart 1200 illustrates iterative re-editing—the first iteration is initialized by the externally edited video, and the rest of the steps receive also the output of the previous iteration, namely the modified storyboard (and optionally the currently re-edited video to be displayed to the user).

Finding the Original Shots in an Edited Video

There is a vast literature on detecting the original shots of an edited video, both in the academic world and in the industry. This task is sometimes referred-to as "segmentation of video sequences", "detection of transitions" or "detection of scene-changes". Most commonly, this task is done by finding moments when there is a large discontinuity between adjacent frames in the edited video. A different approach is to segment the video to visually coherent scenes (which takes into account not only the local neighborhood of each frame in the video but also distant information). This task becomes slightly harder in modern editing algorithms that use, in addition to simple cuts between consecutive shots, various visual effects such as fades, wipes, dissolves and many other transitions and effects. Some works in the literature specifically address different types of transitions. One algorithm that is fairly robust to many transition types is using scene clustering methods to segment the video into shots.

Shortening Edited Videos

Figure 13:
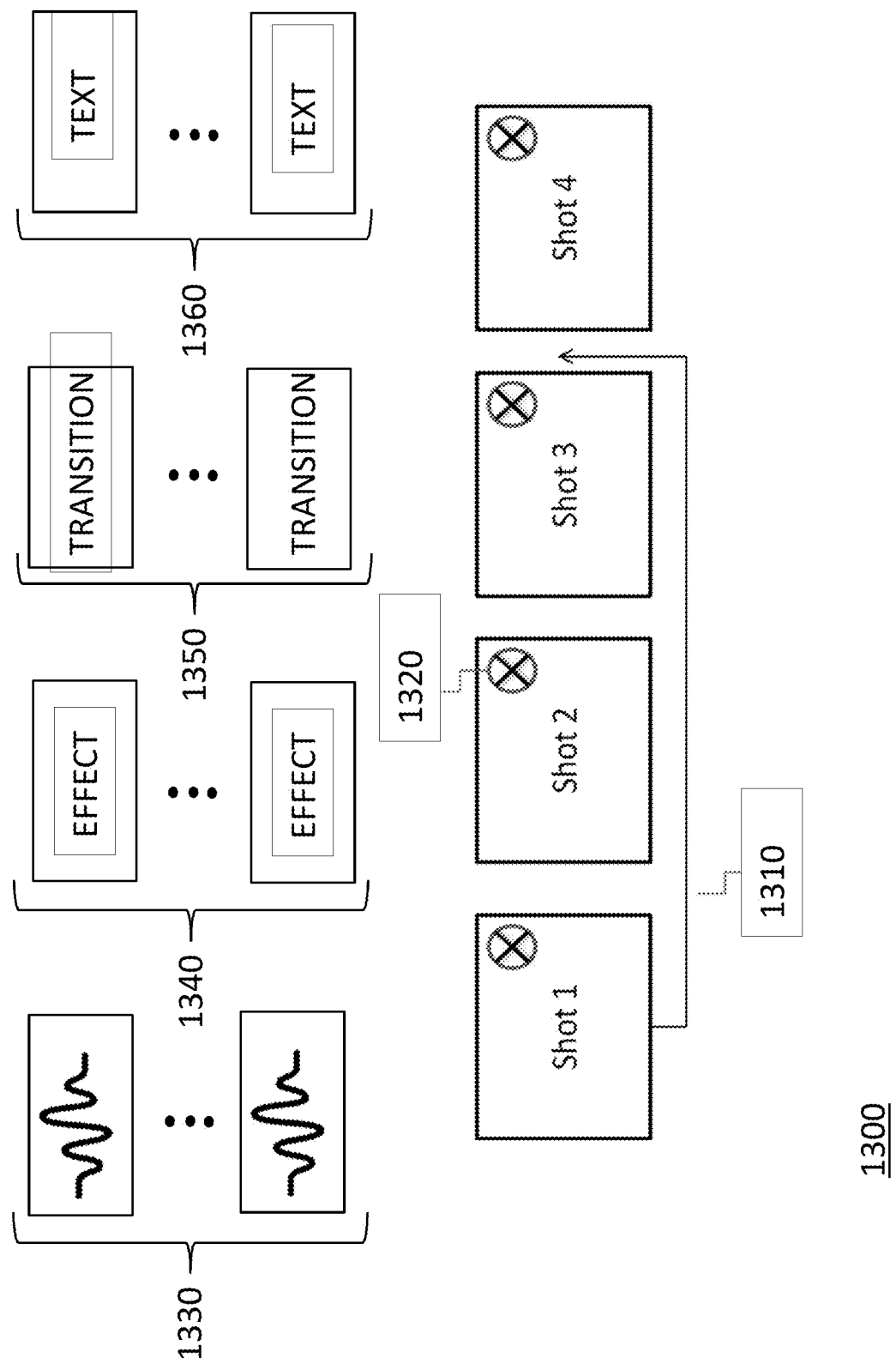
FIG. 13 is a diagram illustrating a user interface in accordance with embodiments according to the present invention.

One of the common implementations of the proposed invention is creating a shorter version of an already edited video. This can be done in two ways
  Semi-Automatic (Flow A in FIG. 11): The user can manually select or reject shots, using a UI that displayed the segmented shots to the user. Such a UI is demonstrated in FIG. 13.
  Fully automatically: The user gives the desired duration, and the system needs to automatically determine how to make it shorter, either (a) by selecting a sub-set of the shots (see next section) or (b) by shortening some of the shots, or (c) by using a combination of both (a) and (b).
FIG. 13 is a diagram illustrating a user interface (UI) in accordance with embodiments according to the present invention. An example UI 1300 for manipulating shots in the storyboard may present the video cuts (shot 1 to shot 4) after being extracted, as well as audio segments 1330, transitions 1350, effects 1340 and texts 1360. In addition, video cuts originated from videos may be represented differently from video cuts originated from photos. The order of the shots can be changed by the user, via grabbing 1310 a shot from one place to another in the storyboard. Each shot can be removed, for example, by clicking on a button 1320. Similarly, the same is applicable for the audio segments 1330, the transitions 1350, and the texts 1360. Transitions and Text can also be replaced with new transitions or Text or be manipulated in various ways. The effects 1340 can also be grabbed and applied to any of the video cuts (shots).

Storyboard User Interface

Flow A in FIG. 11 describes a scheme in which the user manipulates the shots in the storyboard using a UI that displays this storyboard to the user. Such a UI is demonstrated in FIG. 13. Each shot (shot1, shot2, and the like) is represented by an icon which shows either a thumbnail from this shot or an actual relevant video portion (i.e., the video might be playing when pressed upon or being focused by the user). The user may remove or add new shots, either shots that were removed in a previous editing iteration or new external shots that were not part of the edited video. The user may also change the order of shots. Other possible operations may be: add text, add annotations, add voiceover, add effects to each shot (or cancel ones), add or change the transitions between shots, change orientation of shots, mute/un-mute, crop a shot, and the like.

Automatic Shot Selection

Instead of letting the user to manually select the shots via the storyboard UI, the system can automatically select the best shots based on a selection score. This score may be based on an analysis of the video content, to extract people, objects, actions, salient measures, camera motions, image quality measures, etc. These measures can be combined with user preferences such as the ones mentioned before such as the editing style, the importance of faces, importance of specific characters, importance of speech, importance of actions, and the like. The selection of the shots can be based on various algorithms for video editing, where each shot from the input video is treated as a distinctive input video.

In one embodiment of the invention, the user may choose to create multiple variants (e.g., given an input video of 90 seconds, generate 5 videos with a duration of 20 seconds each). In such a case, the shot-selection may involve a random process in order to generate different versions of the original video or alternatively use a pre-defined list of editing parameters (e.g., creating one video with high-pace and one with a low pace, creating one video with more speech and other with less speech, and the like).

Synchronization to Music

If the output duration of the re-edited video is different than the duration of the source video, or if the music soundtrack is replaced in the new video variant, the video should be (re-) synchronized to the new music. This is done by finding an optimal trimming of all shots that maximally aligns the transition between the shots with music beats, and optionally with other musical elements such as breaks or borders of music sections.

When synchronizing to music, two issues should be considered:
  The original editing poses a limit on the duration of each shot (as the raw footage from which the shot was cut is not available).
  A prior could be added for preserving as much as possible the original duration of each shot in order to respecting the original editing. This can be done by adding a prior of $\Sigma_{k=0}^{n}(\text{orig\_dur}_k - \text{new\_dur}_k)$ where orig_durk is the original duration of the k-th shot, and new_durk is the duration of the k-th shot after the synchronization (i.e., its duration in the re-edited video).

Handling B-Roll

Handling an input video with speech may pose an additional challenge—a common tool in video editing is B-roll, in which the audio channel is taken from a preceding video selection while the visual channel is taken from a different photo or video. A method for using B-rolls in automatic and semi-automatic video editing is described, for example, in U.S. Pat. No. 9,524,752, which is incorporated herein by reference in its entirety.

Figure 14:
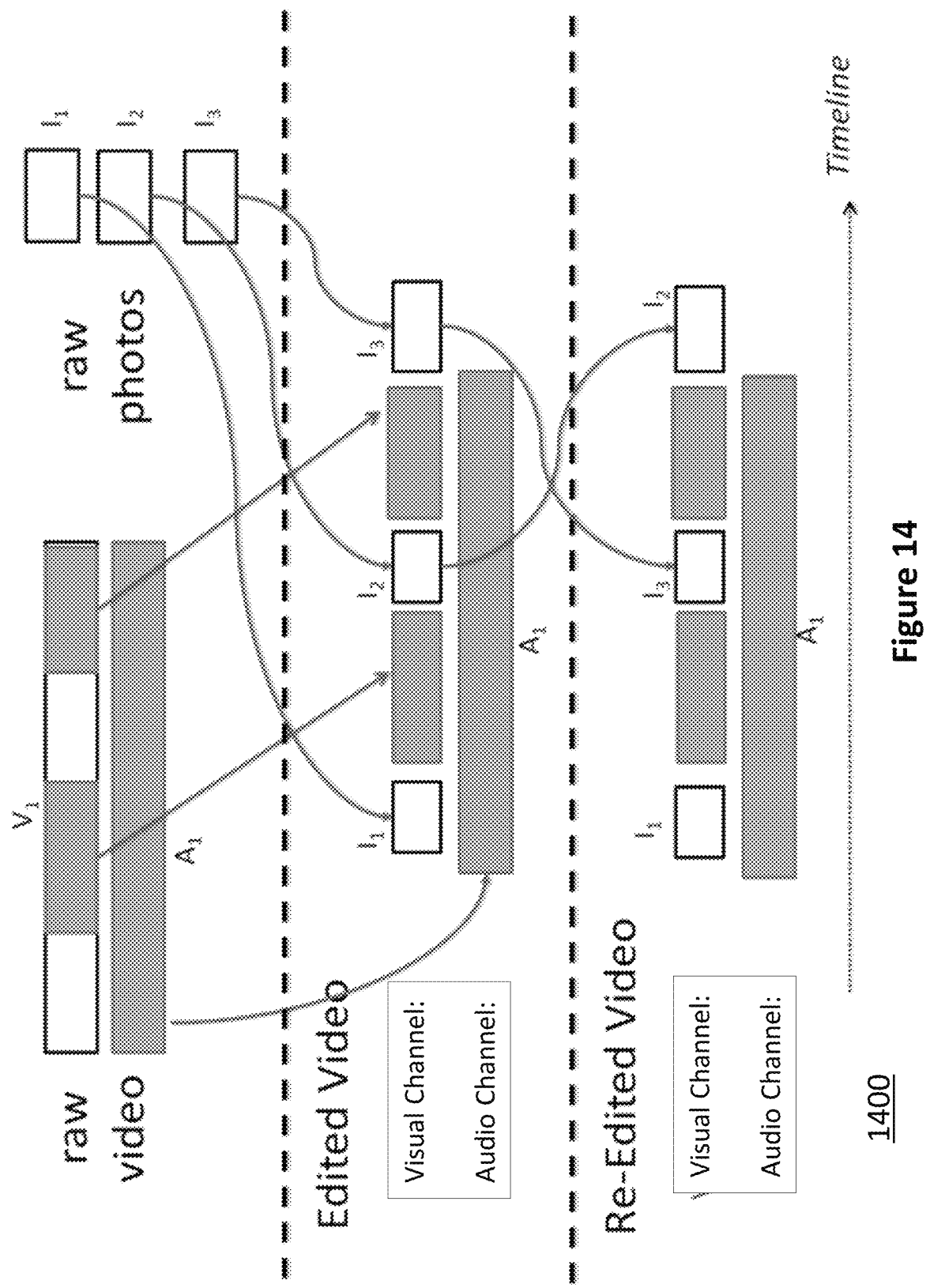
FIG. 14 is a temporal diagram illustrating another aspect of the method in accordance with embodiments according to the present invention.

In this case, the visual and audio channels of the video should be segmented differently—the visual part is segmented as before (e.g., based on visual discontinuity), while the audio channel can have different, usually larger, segments based on audio analysis, for example, by detecting coherent portions of speech. We denote the segmented visual portions as visual shots, and the segmented audio portions as audio shots. When visual and audio portions that are displayed in the same time are taken from a different source footage, we denote the visual part as B-roll, while the portions where the audio and visual channels are taken from the same source footage and synchronized are denoted as A-rolls (For example, in FIG. 14 the A-roll is the portion taken from the video V1 and is synchronized to the audio A1). The A-rolls can be automatically identified in various ways, for example, by visually detecting a speaking person in the frame. B-rolls can be automatically identified, for example, by detecting visual cuts that have no corresponding audio cut (i.e., audio cut that occur at the same time as the video cut).

In the re-editing process, both the audio and visual shots from the original edited video should be respected as much as possible (e.g., we should not cut a speech portion in the middle). One way to respect this B-roll structure is just to keep the portions where this affect is applied intact. A more sophisticated manipulation can be replacing a visual shot that is used as a B-roll with a different visual shot (either from the movie or an external one). This idea is demonstrated in FIG. 14. In this example, the edited video input was constructed (outside the proposed system) from one video (V1) and 3 photos (I1,I2,I3). In the edited video, there is a B-roll effect—where the audio channel is taken from the audio channel of V1 (denoted as A1), while the corresponding visual parts are a mixture of visual portions from V1, and from I1 and I2. During the re-editing flow, the user may change the B-rolls, for example, replacing between I3 and I2 (i.e., I3 is now being used as a B-roll instead of I2, while I2 now appears after V1 in time).

Handling Mixture of Speech and Music

One complexity that may occur in re-editing and should be addressed is cases when the already-edited video is generated from footage that include speech, and when this speech is mixed with the soundtrack music that was originally attached to this edited video (most edited videos consists of external music that is mixed with the audio channel of the footage). In some cases, a clean version of this music may be available, in which case it is relatively easy to decompose the audio channel into the original audio of the footage and the music. However, when the music is not available, one can use various blind decomposition methods to separate the speech from the music.

Automatic Identification of Photo-Shots and Video-Shots in an Edited Video

Many edited videos are constructed (at least in part) from static photos rather than from videos. In such cases, the editing usually involves applying zoom or other camera transformations on each photo. When deconstructing the edited video into its storyboard, it is very useful to decide whether each shot is originated from a video portion or a photo. To do so, we suggest extracting the relative camera transformations between pairs of frames in the same shot (using one of various well-known image registration methods) and checking if the residual difference is small, which indicates that the shot was originally a photo. If not, this shot was probably originated from a video. Indicating that this is the case, one can use this information in various ways:
- Apply a different camera transformation on the photo (for example—by sampling one of the frames from the original photo shot and applying a camera transformation on top of this frame).
- Easily changing the duration of the shot (unlike video shot, trimming the shot will not result in a major loss of information).
- Use different logic for photo shots and video shots in the decomposition and in the re-editing modules, for example, regarding to text as described in the next section.

Handling Text

One of the key assets in video editing is text: titles, captions, and the like. In video editing, text can appear either as a stand-alone shot ("text slide"), or it can be superimposed on top of footage such as a photo or a video clip. In some cases, the user might like to modify the text in the re-editing, for example, to change the duration of the text, or to modify the text itself. This may require separating the text from the footage as part of the re-editing. Text can also be modified automatically, for example, by omitting some of the text messages from the original produced video.

Figure 15:
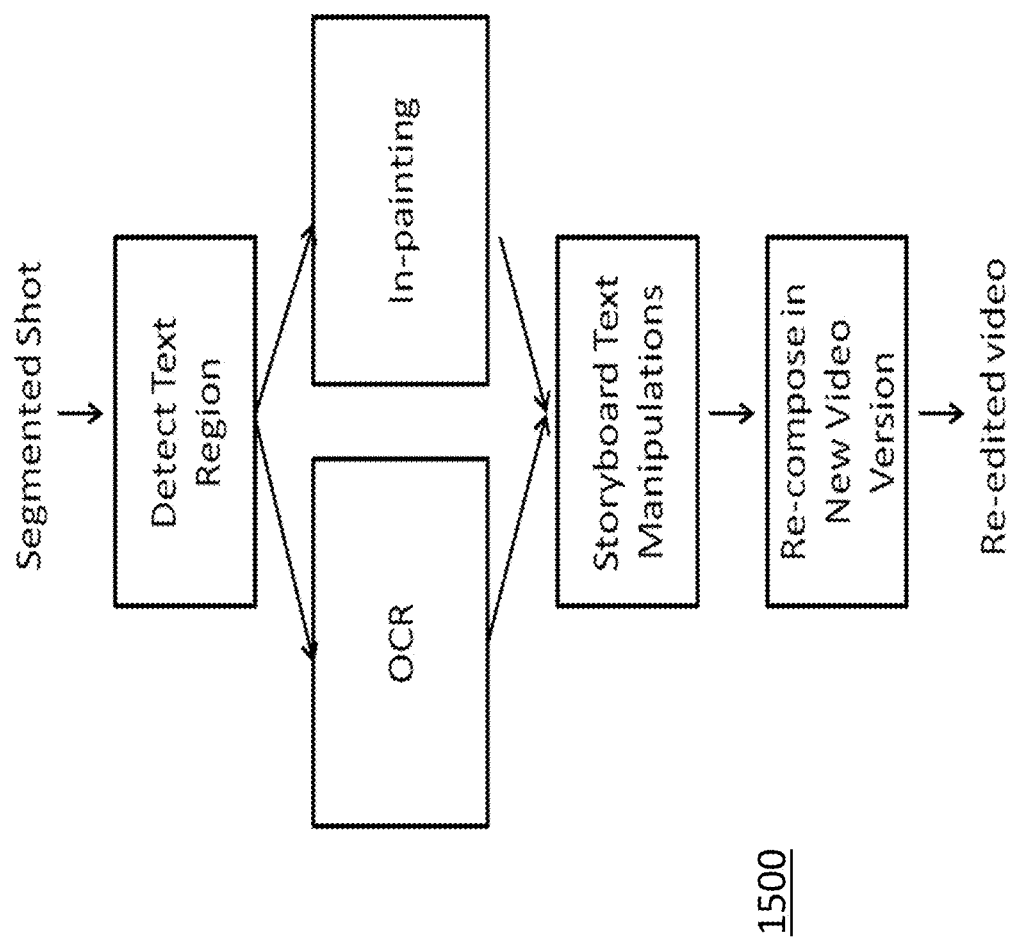
FIG. 15 is a flowchart diagram illustrating another aspect of the method in accordance with embodiments according to the present invention.

Such a process is demonstrated in FIG. 15, which is a flowchart in accordance with some embodiments of the present invention: The text is first detected using various well known methods (such as general object detection methods that can also detect text areas), and the text itself can be extracted, for example, using various OCR methods. The visual content which was occluded by the text can be restored using various image/video in-painting methods (for photo shots, this might be avoided by simply taking the photo from a different frame of the shot where it was not occluded). Finally, the user can view the text as part of the storytelling UI, and modify it (e.g., change the text or change its attributes such as color, duration). In the video generation stage of the re-editing, the modified text is recomposed again on top of the footage.

Similar flow can be used to manipulate other types of graphics and annotations that were added to the video during the original editing. An important example is the logo—the logo can be detected using various methods for logo detection, and it can be retained on top of the re-edited video (Since the position of the logo is usually constant, the process of extracting the logo can usually be avoided as long as the footage itself is not passing some camera or color transformation.

Automatic Detection of Special Shots

Edited videos may include several special components that are not originated from image or video footage: Text slides, Post-Roll, Pre-Roll, Shots with Special Graphics, etc'. Detecting such shots can be done automatically based on text or graphics recognition methods (Post-Roll and Pre-Roll can also be identified simply according to their location in the original edited video, as the first and last shots).

Such shots may be handled differently by the re-editing algorithm—for example, avoiding trimming such shots even if this is needed for music synchronization, giving them a higher prioritization in the automatic selection stage (for example, always selecting them even if the user asks for a shorter version of the edited video), playing the post-roll after the music ends (or the pre-roll before the music starts), or avoiding applying a zoom-in effect or other visual transitions or effects on top of these special shots.

Handling Input Videos with Special Effects

More complex edited videos may include special effects that makes the decomposing of the edited video into its storyboard a harder problem. Two examples may be:
- Split screen: A split screen can be detected, for example by detecting a straight vertical or horizontal line. The split screen can be divided automatically to two separate shots, for example, if the user wishes to cancel this split effect.

Fade: A fade transition may affect the re-edited video by contaminating the separated shots with residuals from their adjacent shots in the original edited video. For example, if shot A came before shot A in the original edited video, but in the re-edited video it comes before shot C, it might still have residuals from shot B due to the original mixture between the shots that resulted from the fade effect. One can overcome (or at least reduce) this problem by one of (a) Avoid changing the order of shots for which the Fade effect (or other similar problematic effects) was used, (b) Trimming the shot frames that were affected by the transition, or (c) Adding a step of "residual cleaning", where the residuals due to the Fade operation are removed from the shot using various in-painting methods or blind source separation (for both videos and photos, information from other frames can be used, for example via extrapolating the relevant pixels).

FIG. 16 is a flowchart diagram illustrating flow B of the method in accordance with embodiments according to the present invention. Flowchart 1600 shows a method for automatically generating a variant video production from an original video production. The steps include: obtaining an original video production made of a plurality of visual assets being video cuts and/or images and at least one original audio track 1610; automatically analyzing content of the original video production, to separate said visual assets 1620; automatically detecting and storing editing operations applied on the visual assets during creation of the original video production 1630; and automatically generating a variant video production based on at least some of the separated visual assets, wherein only some of the separated visual assets retain respective editing operations applied on the visual assets during the creation of the original video production 1640.

According to some embodiments of the present invention, the original video production may be manually edited by a third party.

According to some embodiments of the present invention, the analyzing may further include separating the at least one original audio track into audio cuts.

According to some embodiments of the present invention, the at least one of the video cuts and one of the audio cuts may be synchronized and have non-identical durations, and wherein another one of the video cuts and said audio cut are non-synchronized.

According to some embodiments of the present invention, the analyzing may further include separating the at least one original audio track into speech components and music components.

According to some embodiments of the present invention, the automatically generating a variant video production may further include editing the separated speech components differently than the separated music components.

According to some embodiments of the present invention, the automatically generating may include applying a decision function for deciding which of the separated visual assets retain editing operations applied during the generation of the original video production and which of the visual assets do not retain said editing operations.

According to some embodiments of the present invention, the method may further include the step of repeating the automatically generating with a different selection of visual assets, or of editing operations, to generate a plurality of variant video productions; and selecting a best variant video production based on predefined criteria.

According to some embodiments of the present invention, the selecting of the best variant may be carried out based on success criteria in an online campaign.

According to some embodiments of the present invention, the analyzing further may detect transitions between some of the video cuts within the video production, and wherein the separating includes determining time range of the transition.

According to some embodiments of the present invention, the analyzing may further detect transitions between some of the video cuts within the video production, and wherein the analyzing includes identifying a type of the transition.

According to some embodiments of the present invention, the method may further include restoring the portion of the video cut on which the identified transition was applied, to a state before the transition was applied.

According to some embodiments of the present invention, the original video production may further include video effects applied to some of the video cuts, and wherein the analyzing separates video effects parameters.

According to some embodiments of the present invention, the automatically generating may further include applying video effects parameters on the separated video cuts that are different from the video effects parameters applied in the original video production.

According to some embodiments of the present invention, the original video production may further include at least one video cut generated from a still image and wherein the analyzing further identifies said video cut generated from a still image.

According to some embodiments of the present invention, the method may further include reconstructing the still image from at least one of the frames constituting said video cut generated from the still image.

According to some embodiments of the present invention, the automatically generating further includes applying camera motion parameters on the reconstructed still image that are different from the camera motion parameters may be applied in the video cut generated from the still image.

According to some embodiments of the present invention, the original video production further includes at least one text layer and wherein the analyzing may further identify the text layer, and wherein said automatically generating comprises replacing the identified text layer with a different text layer.

According to some embodiments of the present invention, the automatically generating a variant video production may be applied so that the variant video product satisfies a desired total duration.

According to some embodiments of the present invention, the automatically generating a variant video production may include (a) minimization of the distance of the video cuts in the variant video production from their respective locations in the original video production, and (b) maximization of the number of video cuts synchronized to the music.

According to some embodiments of the present invention, the analyzing of the content of the original video production may include identifying special shots, one of: Text slides, Post-Roll, Pre-Roll, and wherein the automatically generating a variant video production includes handling these special shots differently than other shots.

FIG. 17 is a flowchart diagram illustrating flow A as discussed above of the method in accordance with embodiments according to the present invention. Flowchart 1700 shows a method for assisting re-editing of a video production, that may include the following steps: obtaining a video production that includes a plurality of video cuts and an original audio track 1710; analyzing content of the video production, to separate said video cuts 1720; generating a story board based on said separated video cuts 1730; presenting the story board to a user in a visual representation 1740; and automatically generating a re-edited video production based on one or more editing operations applied by the user over the presented visual representation of the story board 1750.

According to some embodiments of the present invention, the editing operations may include at least one of: cropping, adding, omitting, one or more of the video shots.

According to some embodiments of the present invention, the editing operations may include synchronizing at least some of the plurality of video cuts with a new soundtrack other than the original soundtrack.

According to some embodiments of the present invention, the editing operations may include adding a total duration constraint to the edited video production.

According to some embodiments of the present invention, the presenting of the story board to a user in a visual representation further differentiates between video cuts originated from a video source and video cuts originated from a still image.

According to some embodiments of the present invention, the visual representation further may include transitions and or effects applied during creation of the video production.

According to some embodiments of the present invention, the automatically generating a re-edited video production may be based on one or more manipulations of the transitions or the effects, applied by the user over the presented visual representation of the story board.

According to some embodiments of the present invention, the visual representation further may include text automatically extracted from the video production.

It should be noted that the method according to embodiments of the present invention may be stored as instructions in a computer readable medium to cause processors to perform the method. Additionally, the method described in the present disclosure can be stored as instructions in a non-transitory computer readable medium, such as storage devices which may include hard disk drives, solid state drives, flash memories, and the like.

In order to implement the method according to embodiments of the present invention, a computer processor may receive instructions and data from a read-only memory or a random access memory or both. At least one of aforementioned steps is performed by at least one processor associated with a computer. The essential elements of a computer are a processor for executing instructions and one or more memories for storing instructions and data. Generally, a computer will also include, or be operatively coupled to communicate with, one or more mass storage devices for storing data files. Storage modules suitable for tangibly embodying computer program instructions and data include all forms of non-volatile memory, including by way of example semiconductor memory devices, such as EPROM, EEPROM, and flash memory devices and also magneto-optic storage devices.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that, where the claims or specification refer to "a" or "an" element, such reference is not to be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A method for automatically generating a storyboard from an originally edited video, the method comprising:
   obtaining the originally edited video comprising a plurality of visual assets being video cuts and/or images and transitions and/or video effects applied to said video cuts and/or images and at least one original audio track;

automatically separating said originally edited video, into said video cuts and/or images and transitions and/or video effects applied to said video cuts and/or images, by applying visual analysis to said originally edited video; and automatically generating a storyboard by showing at least some of the video cuts and/or images and at least some of said transitions and/or video effects;

wherein the automatically separating of said originally edited video further includes separating the at least one original audio track into audio cuts, wherein—at least one of the video cuts and one of the audio cuts are synchronized and have non-identical durations, and wherein another one of the video cuts and said audio cut are non-synchronized.

2. The method according to claim 1, wherein the originally edited video is manually edited by a third party.

3. A method for automatically generating a storyboard from an originally edited video, the method comprising:

obtaining the originally edited video comprising a plurality of visual assets being video cuts and/or images and transitions and/or video effects applied to said video cuts and/or images and at least one original audio track;

automatically separating said originally edited video, into said video cuts and/or images and transitions and/or video effects applied to said video cuts and/or images, by applying visual analysis to said originally edited video;

automatically generating a storyboard by showing at least some of the video cuts and/or images and at least some of said transitions and/or video effects;

automatically generating a further video production based on at least some of the video cuts and/or images with at least some of said transitions and/or video effects wherein in the further video production, at least some of said transitions and/or video effects are modified compared with the originally edited video; and separating the at least one original audio track into speech components and music components wherein the automatically generating a further video production further comprises editing the separated speech components differently than the separated music components.

4. The method according to claim 3, wherein the automatically separating of said originally edited video further includes separating the at least one original audio track into speech components and music components.

5. A method for automatically generating a storyboard from an originally edited video, the method comprising:

obtaining the originally edited video comprising a plurality of visual assets being video cuts and/or images and transitions and/or video effects applied to said video cuts and/or images and at least one original audio track;

automatically separating said originally edited video, into said video cuts and/or images and transitions and/or video effects applied to said video cuts and/or images, by applying visual analysis to said originally edited video;

automatically generating a storyboard by showing at least some of the video cuts and/or images and at least some of said transitions and/or video effects;

automatically generating a further video production based on at least some of the video cuts and/or images with at least some of said transitions and/or video effects wherein in the further video production, at least some of said transitions and/or video effects are modified compared with the originally edited video;

repeating the automatically generating a further video production, to generate a plurality of further video productions; and selecting a best further video production based on predefined criteria, wherein the selecting of the best further video production is carried out based on success criteria in an online campaign.

6. The method according to claim 5, wherein the applying visual analysis to said originally edited video separates video effects parameters.

7. A method for automatically generating a storyboard from an originally edited video, the method comprising:

obtaining the originally edited video comprising a plurality of video cuts and/or images, at least one text layer, and at least one original audio track;

automatically separating said originally edited video, into said video cuts and/or images and at least one text layer, by applying visual analysis to said originally edited video; and automatically generating a storyboard by showing at least some of the video cuts and/or images and at least some of said at least one text layer, wherein the originally edited video further includes at least one text layer and wherein the applying visual analysis to said originally edited video further identifies said text layer, and wherein said automatically generating a further video production comprises replacing the identified text layer with a different text layer.

8. A method for automatically generating a storyboard from an originally edited video, the method comprising:

obtaining the originally edited video comprising a plurality of visual assets being video cuts and/or images and transitions and/or video effects applied to said video cuts and/or images and at least one original audio track;

automatically separating said originally edited video, into said video cuts and/or images and transitions and/or video effects applied to said video cuts and/or images, by applying visual analysis to said originally edited video;

automatically generating a storyboard by showing at least some of the video cuts and/or images and at least some of said transitions and/or video effects;

automatically generating a further video production based on at least some of the video cuts and/or images with at least some of said transitions and/or video effects wherein in the further video production, at least some of said transitions and/or video effects are modified compared with the originally edited video, wherein the automatically generating a further video production includes (a) minimization of the distance of the video cuts in the further video production from their respective locations in the original video production, and (b) maximization of the number of video cuts synchronized to the music.

9. The method according to claim 8, wherein the automatically generating a further video production is applied so that the further video product satisfies a desired total duration.

10. A method for automatically generating a storyboard from an originally edited video, the method comprising:

obtaining the originally edited video comprising a plurality of video cuts and/or images, at least one text layer, and at least one original audio track;

automatically separating said originally edited video, into said video cuts and/or images and at least one text layer, by applying visual analysis to said originally edited video; and automatically generating a storyboard by showing at least some of the video cuts and/or images and at least some of said at least one text layer, wherein the applying visual analysis to said originally edited video includes identifying special shots, comprising at least one of: Text slides, Post-Roll, Pre-Roll.

* * * * *